United States Patent
van Petegem et al.

(10) Patent No.: US 10,309,172 B2
(45) Date of Patent: *Jun. 4, 2019

(54) HYDRAULIC DIVERSION SYSTEMS TO ENHANCE MATRIX TREATMENTS AND METHODS FOR USING SAME

(71) Applicant: Weatherford Technology Holdings, LLC, Houston, TX (US)

(72) Inventors: Ronald van Petegem, Houston, TX (US); Andrew Duncan, Dubai (AE); Alfredo Mendez Zurita, Houston, TX (US); Kern L. Smith, Houston, TX (US); Leonid Vigderman, Houston, TX (US); Rajesh K. Saini, Houston, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/117,490

(22) Filed: Aug. 30, 2018

(65) Prior Publication Data

US 2018/0371851 A1 Dec. 27, 2018

Related U.S. Application Data

(63) Continuation of application No. 14/257,782, filed on Apr. 21, 2014, now abandoned.
(Continued)

(51) Int. Cl.
| | | |
|---|---|---|
| *E21B 33/138* | (2006.01) | |
| *E21B 43/14* | (2006.01) | |
| *E21B 21/00* | (2006.01) | |
| *E21B 49/08* | (2006.01) | |
| *C09K 8/50* | (2006.01) | |
| *C09K 8/506* | (2006.01) | |
| *E21B 43/02* | (2006.01) | |

(Continued)

(52) U.S. Cl.
CPC ............... *E21B 21/00* (2013.01); *C09K 8/50* (2013.01); *C09K 8/506* (2013.01); *C09K 8/508* (2013.01); *C09K 8/5751* (2013.01); *E21B 33/138* (2013.01); *E21B 43/025* (2013.01); *E21B 43/14* (2013.01); *E21B 49/08* (2013.01); *C09K 2208/20* (2013.01); *C09K 2208/26* (2013.01)

(58) Field of Classification Search
CPC .......... E21B 43/25; E21B 21/00; E21B 43/14; E21B 49/08
See application file for complete search history.

(56) References Cited

U.S. PATENT DOCUMENTS

2009/0078419 A1* 3/2009 Dusterhoft ............... C09K 8/50
166/295
2009/0151944 A1* 6/2009 Fuller ..................... C09K 8/536
166/280.2

FOREIGN PATENT DOCUMENTS

DE 4027300 3/1992
JP 8151422 6/1996
(Continued)

*Primary Examiner* — Silvana C Runyan
(74) *Attorney, Agent, or Firm* — Vorys, Sater, Seymour and Pease LLP

(57) ABSTRACT

Systems and methods for treating formation intervals including forming a low permeability layer on a surface of the interval and pumping a sand control treating solution through the layer, which diverts the flow into the formation permitting improved treatment uniformity and improved overall internal treatment.

20 Claims, 17 Drawing Sheets

Related U.S. Application Data

(60) Provisional application No. 61/814,071, filed on Apr. 19, 2013.

(51) Int. Cl.
*C09K 8/508* (2006.01)
*C09K 8/575* (2006.01)

(56) References Cited

FOREIGN PATENT DOCUMENTS

| | | |
|---|---|---|
| JP | 100001461 | 1/1998 |
| JP | 10110115 | 4/1998 |
| JP | 2005194148 | 7/2005 |

* cited by examiner

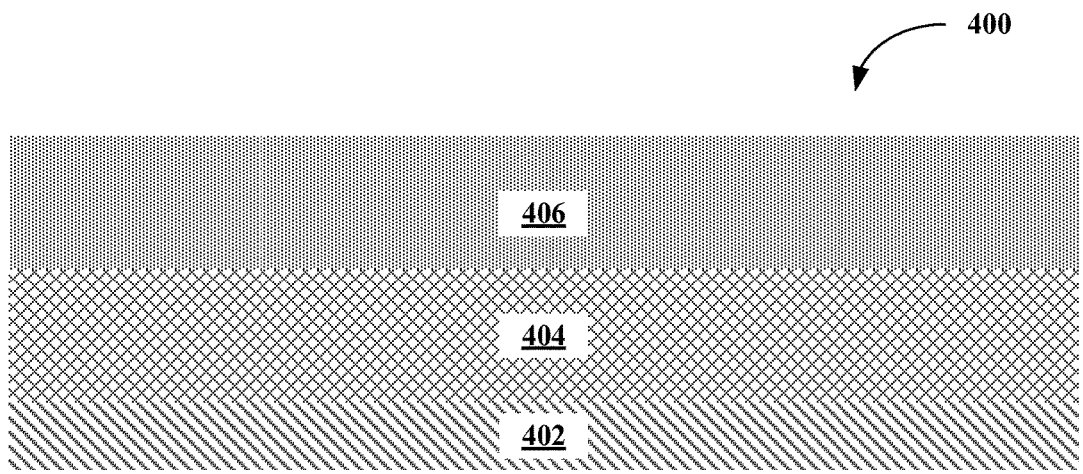
FIG. 4A
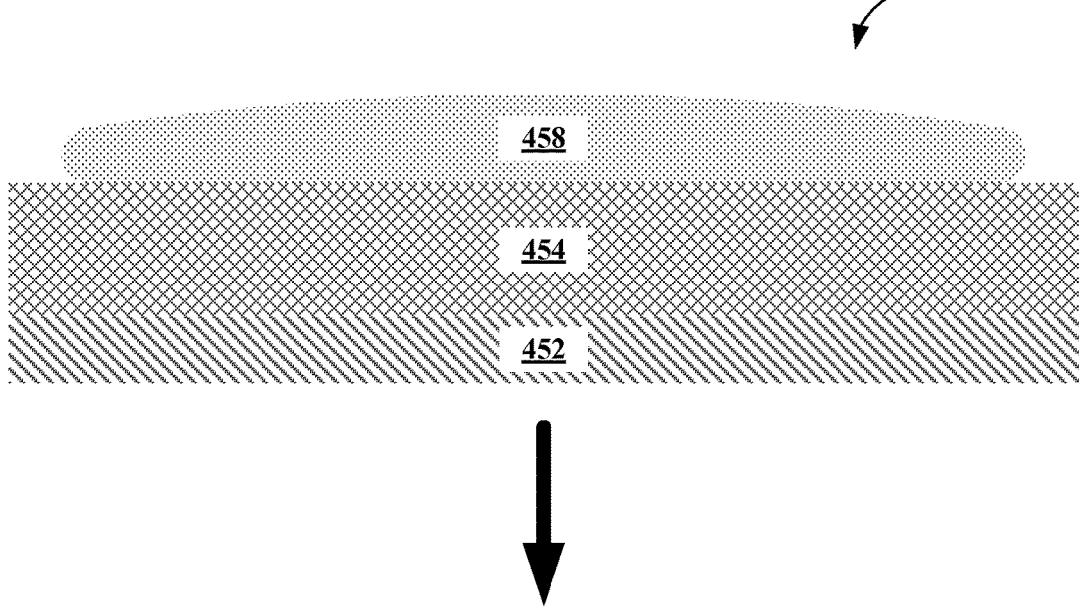
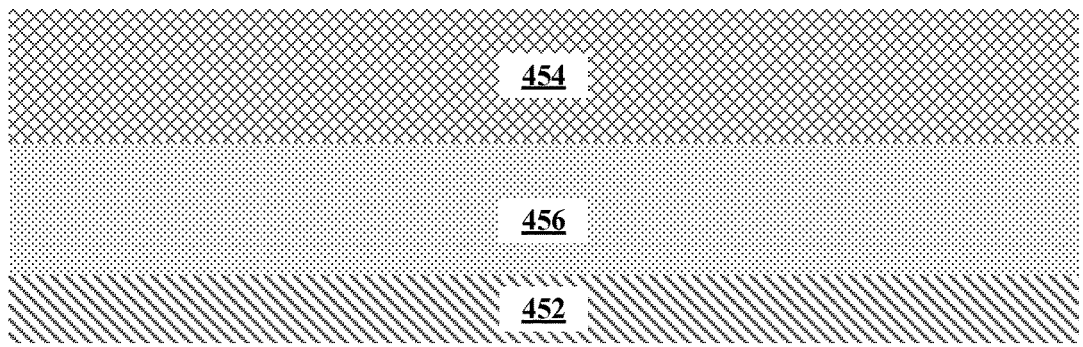
FIG. 4B

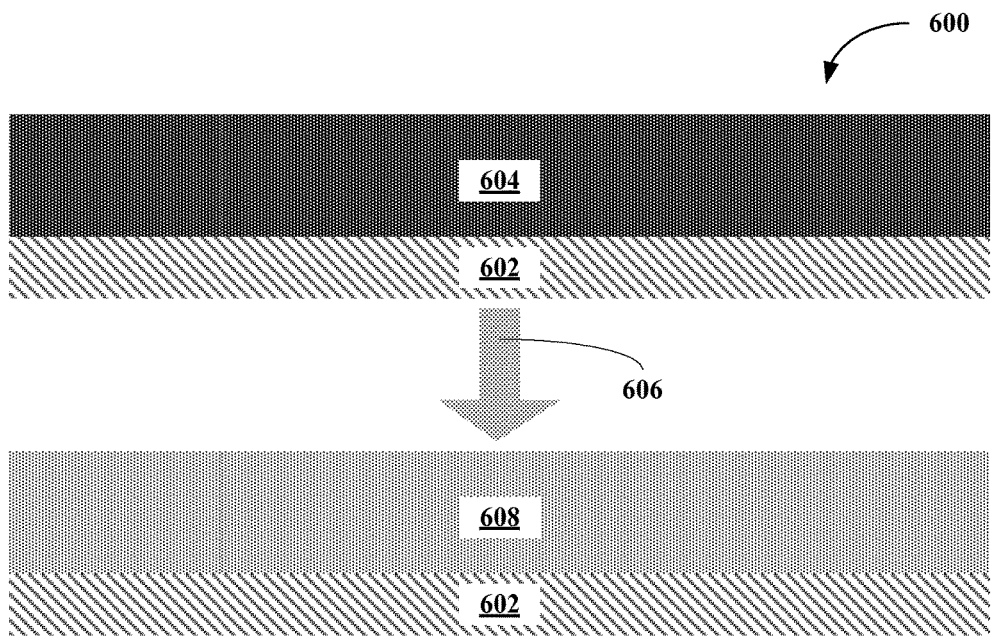
FIG. 6
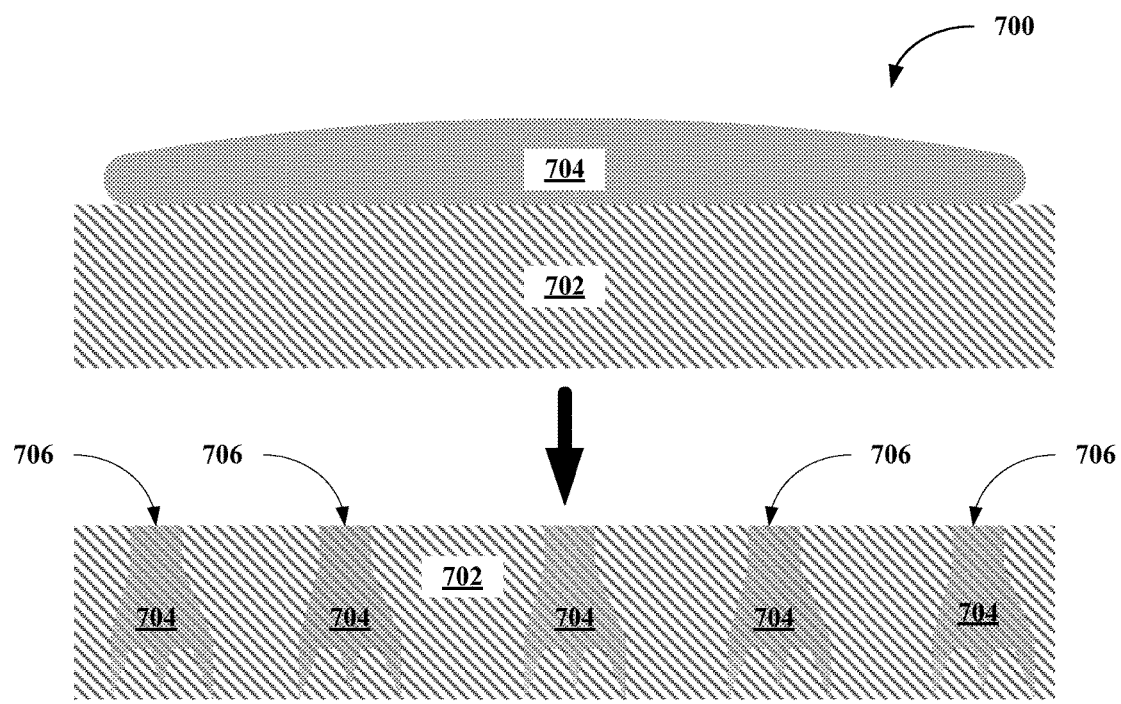
FIG. 7 – Prior Art

HYDRAULIC DIVERSION SYSTEMS TO ENHANCE MATRIX TREATMENTS AND METHODS FOR USING SAME

RELATED APPLICATION

This application claims priority to U.S. patent application Ser. No. 14/257,782 filed Apr. 21, 2014, which claims priority to Provisional Patent Application Ser. No. 61/814,071, filed Apr. 19, 2013, the disclosures of which are both incorporated herein by reference for all purposes.

BACKGROUND OF THE INVENTION

1. Field of the Invention

Embodiments of this invention relates to systems and methods for controlling leak off of formation treatments injected into a producing formation or injection formation or a zone thereof, especially in producing formations having long producing intervals such as horizontal wells or in producing formations having short producing intervals having high permeability segments.

More particularly, embodiments of this invention relates to systems and methods for controlling leak off of formation treatments injected into a producing formation or a zone thereof, especially in producing formations having long producing intervals such as horizontal wells or in producing formations having short producing intervals with high permeability segments, where the systems and methods include forming a controlled permeability layer on the formation surface, on a well screen, on a gravel pack, on a sand pack, or between the formation surface and/or the production tubing or working sting so that injected treatments are diverted through the controlled permeability layer into the formation or intervals yielding a uniform distribution of the treatment across the formation or intervals.

2. Description of the Related Art

During the placement of chemicals in a formation, formation zone or a formation matrix, it is often very difficult to achieve acceptable coverage of a complete interval, especially if the interval is a long extending interval or has non constant or high permeability like interval(s) found in horizontal wells. Specifically during matrix treatments such as sand and water control treatments, placement and coverage is critical. Permeability contrasts within the matrix may cause treating fluids to leak-off uncontrolled causing parts of the matrix to remain un or insufficiently treated.

Historically, the problem has been addressed in several ways, including rate diversion, mechanical diversion such as packers, polymers, etc. While many temporary plugs for leak-off and diversion have been developed for drilling and fracturing application, such temporary diversion layers have not been applied to create a controlled permeability layer to enhance diversion of chemical sand control product treatments or applications or other treatment or applications.

On the other hand, in this invention, pumping a filter composition of this invention will form a filter cake or filter layers across the entire formation. The filter cake or layer will have a controlled permeability that partially or substantially equalizes the effective formation permeability so that well treatments may be delivered to all formation zones equally with equal effectiveness. Therefore, the well treatment will actually occur through the filter cake or layer across the entire or a majority portion of a formation or zone or zones thereof, rather than the filter cake or layer being used to seal off segments of the formation and then divert away from them.

SUMMARY OF THE INVENTION

Embodiments of this invention provide systems including a well bore having a producing formation, a producing interval, or producing intervals or an injection formation, an injection interval, or injection intervals and one controlled permeability layer or a plurality of controlled permeability layers formed on the formation or interval surfaces or in an annular space between the formation or interval surfaces and the surfaces of production tubing. The controlled permeability layers are sometimes referred to as diversion layers. The controlled permeability layers have a tailored or desired permeability and are temporary, i.e., the layers comprise temporary or removable bridging layers. The layers comprise a reduced permeability filter cake on the formation or interval surfaces allowing controlled leak off of chemical treating solution into the formation or intervals so that the chemical treatments are more uniformly distributed across the formation or interval. The controlled permeability of the layers may be due to the nature of the layer materials used or may be formed in the layers by the inclusion of one or more (one or a plurality of) erodible or dissolvable components in the filter cake forming composition, i.e., the composition used to form the diversion layers include one or more (one or a plurality of) removable components and one or more (one or a plurality of) erodible or dissolvable components. The erodible or dissolvable components are designed to be erodible or dissolvable when placed in contact with a treating fluid such as a solvent system. In other embodiments, the layers have augmented permeabilities due to the selective removal of erodible or dissolvable components in the layers. In other embodiments, the systems may also include isolation packers to isolate formations, intervals, or segments to be treated. In certain embodiments, the layer or layers are selectively dissolvable or removable using a dissolution solution. In other embodiments, the layer or layers are erodible or removable due to in situ acid generation or due to minimal lift-off pressure. In other embodiments, the layers may be permanent or substantially permanent and the permeability of the layer(s) may vary with time, or may be engineered so that the permeability of the layer(s) changes over time. In certain embodiments, the layer(s) may be only partially removed, especially for injection wells. In other embodiments, the permeability of the layer(s) may be increased over time, especially for injection wells.

Embodiments of this invention also provide methods for diverting well treatments, including forming a reduced permeability layer or plurality of reduced permeability layers on a surface of a producing formation, a producing formation interval, or producing formation intervals or an injection formation, an injection formation interval, or injection formation intervals, on an annular space between the formation or interval surfaces and production tubing surface, or on a screen assembly and/or a gravel or sand pack, where the layers may be placed prior to and/or during treatment. In certain embodiments, the methods include forming or placing the layers prior to sand control treatment. In other embodiments. the methods include forming or placing the layer(s) with a composition including one or more (one or a plurality) removable components and one or more (one or a plurality) erodible or dissolvable components (i.e., erodible or dissolvable when exposed to a particular solvent system or placing solution) prior to sand or water control treatment followed by exposing the layers to a dissolution solution to erode or dissolve the erodible or dissolvable components. In other embodiments, the methods may also include one or more interval isolation packers so that different portions of the intervals may be treated separately. In other embodiments, the intervals are associated with producing formations, while, in other embodiments, the intervals are associated with injection formations. In other embodiments, the methods may also include preparing a layer that is more permanent—substantially permanent to permanent, but may be engineered so that the permeability of the layers change over time. The more permanent layers are especially well suited for injection wells.

Embodiments of this invention also provide methods and systems for diverting well treatments including providing a filter cake composition including sized, selectively dissolvable/removable particles capable of forming a predictable low permeability filter-cake layer or layers. The methods and systems also include engineered placement of particles to form the filter-cake that create a predictable low permeability filter-cake layer or layers on a surface of a producing formation, a producing formation interval, or producing formation intervals or an injection formation, an injection formation interval or injection formation intervals, on an annular space between the interval surface and production tubing surface, on screen assembly and/or on a gravel pack or on a sand pack, where the filter-cake placement may occur with a Newtonian fluid or a non-Newtonian fluid. The methods and systems also include using a leak-off model to design the treatment fluid placement, where the layer or layers act to divert the treating fluid so that the treating fluid is more uniformly introduced into the formation or interval resulting in a more uniform formation treatment. The methods and systems also include filter-cake removal either by using a filter-cake removal composition or by in situ acid generation or by minimal lift-off pressure as fluids are produced from the formation, interval, or intervals. In the case of injection formation, the layers may be permanent or substantially permanent or may be removed by treating the formation with a filter-cake removal composition or by in situ acid generation.

BRIEF DESCRIPTION OF THE DRAWINGS

The invention can be better understood with reference to the following illustrative drawings:

FIGS. 4A&B depict other embodiments of diverted formations and methods for preparing them.

FIG. 6 depicts another embodiment of a diverted formation and a method for preparing same.

FIG. 7 illustrates a prior art treatment of a formation, where a diverting layer was not deposited on the formation prior to treatment.

DETAILED DESCRIPTION OF THE INVENTION

Figure 1:
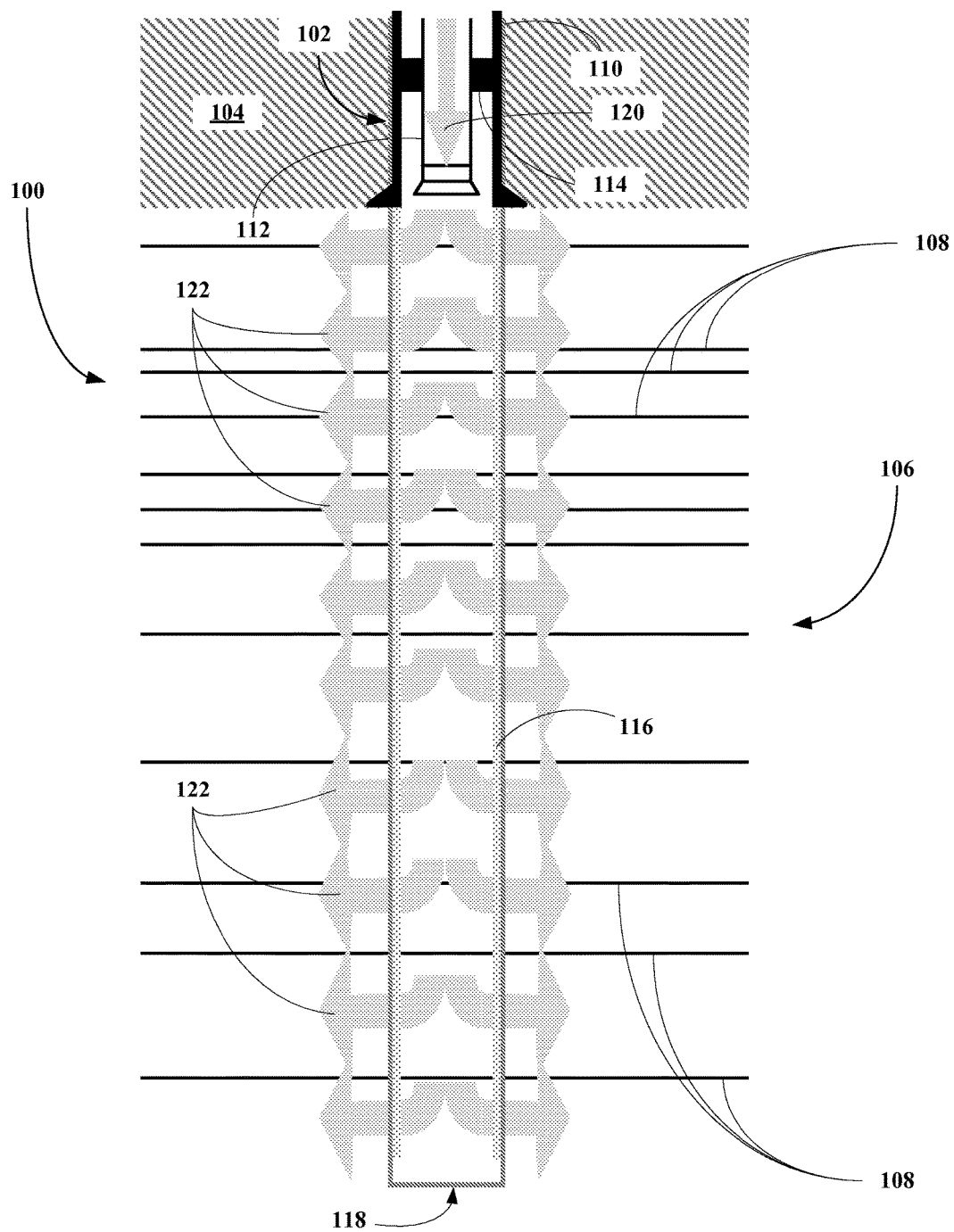
FIG. 1 depicts an embodiment of a vertically disposed well having a long producing interval including one diversion layer showing the diverted flow of treating material into the formation.

The inventors have found that systems and methods may be implements for diverting sand and/or water control or other chemical treatments into a formation by forming a controlled permeability layer on the surface of a producing interval, where the layer includes a composition having a low permeability. The layer comprises a graded/sized bridging material having controlled permeability. The inventors have found that the present invention increases the interval length that can be treated with SandAid, a Weatherford treatment technology, or other matrix treatment from short intervals because of limitations in product placement into long sections with varying permeability. The inventors have also found that the layer may also include viscosifiers to improve the formation of the reduced permeability filter cake across the interval. The inventors have found that the bridge layer include pore spaces formed by materials in the layer, which may include particulate solids, and erodible or dissolvable particulate materials. The inventors have also found that the layer may also include a polymer to enhance placement of the reduced permeability filter cake. The inventors have found that after breaking the optional polymer gel or viscosifier, a filter cake may be formed that has a predictable and selective permeability. Once formed, the inventors have found that a sand and/or water control treatment may be pumped into formation from the bullhead at the surface using a brine carrier, where the filter cake acts as a diversion layer for more uniformly distributing the treating composition into the interval.

The inventors have also found that the diversion layer may be used with coil tubing (CT) or jointed pipe. The inventors have found that a filter cake may be formed across the whole interval, but without any breaker or removing agent. The inventors have found that the methods may also include selectively, treating each interval, where annular cross flow may be prevented by placing pressure in the CT/OH (or casing or even screen) annulus, while treating down the CT. In this embodiment, we would first pump a weak acid to break the polymer and then use the permeable filter cake to do the diversion. This method, has no theoretical limits to it length, other than how far CT may be extended into the well, especially a horizontal well with long intervals.

The inventors have found that the size, shape, density, and packing of the bridging material may be used to control permeability of the low permeable filter cake layer, because that can be done without any intervention. The inventors have also found that the cake layer material may just be produced back or the layer may be dissolved using a layer dissolution treating solution.

LAYER PROPERTIES OF THIS INVENTION

The layer forming compositions may include between 0.1 vol. % to 60 vol. % of particulate solids suspended in a base fluid. In certain embodiments, the layer forming compositions include between 1 vol. % to 10 vol. % of particulate solids suspended in a base fluid. Suitable base fluid include water, viscosified water, aqueous solutions, well treating fluids, or other similar fluids used in downhole operations.

The thickness of the diversion layer or layers range from about 0.01 mm to about 30 mm. In certain embodiments, the diversion layer or layers thickness range from about 0.1 mm to about 10 mm. In other embodiments, the diversion layer or layers thickness range from about 0.2 mm to about 2 mm. In certain embodiments, the diversion layer or layers thickness range from about 0.2 mm to about 1 mm. In certain embodiments, larger thickness may be needed to fill any cracks or natural fractures in the formation, on top of which smaller particle diversion layer can form.

The particle size distributions of the diversion layer forming materials are between 0.1 µm and 800 µm. In certain embodiments, the particle size distributions of the diversion layer forming materials are between 0.5 µm and 500 µm. In other embodiments, the particle size distributions of the diversion layer forming materials are between 0.1 µm and 200 µm. In other embodiments, the particle size distributions of the diversion layer forming materials are between 0.1 µm and 100 µm. In other embodiments, the particle size distributions of the diversion layer forming materials include materials having different particle size distribution. In certain embodiments, the layer materials include materials having a particles size distribution between 0.1 µm and 50 µm, materials having a particle size distribution between 0.1 µm and 500 µm. In certain embodiments, the layer materials include materials having a particles size distribution between 0.1 µm and 500 µm, but having overlapping distributions having peak distribution values of about 5 µm, 10 µm, 20 µm, 40 µm, 50 µm, 60 µm, 70 µm, 80 µm, 90 µm and 100µ. The term peak distribution means the particles size making the largest contribution to the distribution. In other embodiments, the particle size distribution of the material is initially high, between 1 mm and 3 mm, to fill in any cracks or natural fractures in the formation, and then successively lower particle sizes are pumped to form the diversion layer.

The layer or layers have a permeability between about 1 mD and about 100 mD. In certain embodiments, the permeability is between about 1 mD and about 90 mD. In other embodiments, the permeability is between about 1 mD and about 80 mD. In other embodiments, the permeability is between about 1 mD and about 70 mD. In other embodiments, the permeability is between about 1 mD and about 60 mD. In other embodiments, the permeability is between about 1 mD and about 50 mD. The layers once deposed or placed on the surfaces of formation, interval, intervals or zones thereof, the layers equalize the permeability of the zone reducing or eliminating "thief zones". Thus, the layers equalize the permeability of zones having permeability ranging from 100 mD to 3000 mD so that well treating fluids will flow more evenly into all zone without being directed only to the high permeability zones. In this manner, the diversion layers permit well treatments to have improved zone coverage, uniformity and completeness.

SUITABLE REAGENTS FOR USE IN THE INVENTION

Removable Components suitable removable bridging or diversion agents for forming the low permeability or diversion layer include, without limitation, any particulate material that has low or no solubility in a given carrier such as a brine. Exemplary examples of removable components include, without limitation, (1) alkaline metal carbonates such as magnesium carbonate ($MgCO_3$), calcium carbonate ($CaCO_3$), strontium carbonate ($SrCO_3$), and/or barium carbonate ($BaCO_3$), (2) asphalts such as gilsonite, bitumen, and/or asphaltum, (3) mixtures or combinations thereof. The removable agents or components are removable by treating the layer under acid conditions, i.e., treating the layer with an acid solution. Suitable acids include, mineral acids, organic acids, or mixtures or combinations thereof. Suitable mineral acids include, without limitation, hydrochloric acid, sulfuric acid, and/or nitric acid. Suitable organic acids include, without limitation, formic acid, acetic acid, lactic acid, glycolic acid, propanoic acid, other lower carbon number acids, or mixtures and combinations thereof.

Erodible or Dissolvable Components suitable erodible or dissolvable bridging or diversion agents for adding into the bridging agents include, without limitation, hydratable polymers, gelled hydratable polymers, hydrocarbon soluble polymers, other polymers that may be added to the bridging agents and erode or dissolve away after placement of the layer by production fluids or using a dissolution fluid that solubilizes the polymers, or mixture and combinations thereof. For hydratable or gelled hydratable polymers, aqueous solutions are suitable to erode or dissolve the polymers. In certain embodiments, the aqueous solution includes a breaker to break the gelled hydratable polymers to enhance erosion or dissolution. For hydrocarbon soluble polymers, erosion will generally occur simply by being exposed to producing fluids as the hydrocarbon components in the producing fluids dissolve the hydrocarbon polymers. In other embodiments, the solution may be a solvent system injected into the well to dissolve the polymers. Suitable solvent system include diesel fuels or other light hydrocarbon fluids. With other polymers, the solvent system will include components known to dissolve or erode the polymers.

Hydratable Polymers

Suitable hydratable polymers that may be used in embodiments of the invention include any natural and/or synthetic hydratable polymer capable of forming a gel in the presence of at least one cross-linking agent of this invention and any other polymer that hydrates upon exposure to water or an aqueous solution capable of forming a gel in the presence of at least one cross-linking agent of this invention. For instance, suitable natural hydratable polysaccharides include, but are not limited to, galactomannan gums, glucomannan gums, guars, derived guars, and cellulose derivatives. Specific examples are guar gum, guar gum derivatives, locust bean gum, Karaya gum, carboxymethyl cellulose, carboxymethyl hydroxyethyl cellulose, and hydroxyethyl cellulose. Presently preferred thickening agents include, but are not limited to, guar gums, hydroxypropyl guar, carboxymethyl hydroxypropyl guar, carboxymethyl guar, and carboxymethyl hydroxyethyl cellulose. Suitable hydratable polymers may also include synthetic polymers, such as polyvinyl alcohol, polyacrylamides, poly-2-amino-2-methyl propane sulfonic acid, and various other synthetic polymers and copolymers. Other suitable polymers are known to those skilled in the art. Other examples of such polymer include, without limitation, guar gums, high-molecular weight polysaccharides composed of mannose and galactose sugars, or guar derivatives such as hydropropyl guar (HPG), carboxymethyl guar (CMG), carboxymethylhydropropyl guar (CMHPG), hydroxyethylcellulose (HEC), hydroxypropyl cellulose (HPC), carboxymethylhydroxyethylcellulose (CMHEC), xanthan, scleroglucan, and/or mixtures and combinations thereof. Suitable synthetic polymers include, without limitation, polyacrylamide, polyacrylate polymers and copolymers thereof, and mixtures or combinations thereof. Other examples of suitable hydratable polymers are set forth herein. Suitable Chia seed materials include, without limitation, *Salvia hispanica* seed, *Salvia lavandulifolia* seed, *Salvia columbariae* seed, or mixtures and combinations thereof. These species are in the following genius: Plantae, Angiosperms, Eudicots, Asterids, Lamiales, Lamiaceae, and *Salvia*. In certain embodiments, the Chia seed material are used without further processing. In other embodiments, the Chia seed material is fractured or partially ground. In other embodiments, the Chia send material is fully ground.

Suitable synthetic hydratable polymers for use in the crosslinkable polymer systems of this invention include, without limitation, a partially hydrolyzed acrylamide polymer or mixture of partially hydrolyzed acrylamide polymers. The partially hydrolyzed acrylamide polymers comprise acrylamide polymers being hydrolyzed to a degree greater than or equal to about 0.2% (percent of acrylamide groups hydrolyzed to carboxylate groups). In certain embodiments, the degree of hydrolysis is greater than or equal to about 0.5%. In other embodiments, the degree of hydrolysis is between about 0.2% and about 15%. In other embodiments, the degree of hydrolysis is between about 0.5% and about 10%. The average molecular weight of the acrylamide polymer is generally in the range between about 10,000 and about 50,000,000. In certain embodiments, the acrylamide polymer has an average molecular weight between about 100,000 to about 20,000,000. In other embodiments, the acrylamide polymer has an average molecular weight between about 200,000 and about 12,000,000. In other embodiments, the acrylamide polymer has an average molecular weight between about 100,000 to about 11,000,000. In other embodiments, the acrylamide polymer has an average molecular weight between about 200,000 and about 1,000,000. In other embodiments, the acrylamide polymer has an average molecular weight between about 250,000 and about 300,000. The polyacrylamide has most preferably greater than about 0.1 mole % polymer carboxylate groups. The polymer concentration in the gelation compositions are generally between about 0.05% and 10% by weight. In certain embodiments, the polymer concentration is between about 1% and about 8% by weight. In certain embodiments, the polymer concentration is between about 2% and about 5% by weight of polymer in water.

Crosslinking Agents

Suitable crosslinking agents for use in the crosslinking systems of this invention include, without limitation, a polyvalent metal carboxylate complex crosslinking agent derived from a carboxylate compound or mixture thereof. In solution, the crosslinking agent comprises an electronegative carboxylate species, which may include one or more of the following water soluble species: formate, acetate, proprionate, lactate, substituted derivatives thereof, and mixtures thereof. In addition to electronegative carboxylate species, the solution comprises electropositive metallic species such as $Al^{3+}$, $Fe^{3+}$, $Ti^{4+}$, $Zn^{2+}$, $Sn^{4+}$, $Cr^{3+}$, etc. In certain embodiments, the crosslinking agents are chromium (III) acetate complexes. The weight ratio of polymer to crosslinking agent is generally between about 5:1 and about 50:1. In certain embodiments, the ratio is between about 6:1 and about 20:1. In other embodiments, the ratio is between about 7:1 and about 10:1.

Suitable chromium III species include, without limitation, trivalent chromium and chromic ion, an equivalent term, carboxylate species derived from water-soluble salts of carboxylic acids. In certain embodiments, the carboxylic acids are low molecular weight mono-basic acids. Exemplary examples of such carboxylic acids include formic acid, acetic acid, propionic acid, lactic acid, lower substituted derivatives thereof and mixtures thereof. The carboxylate species include the following water-soluble species: formate, acetate, propionate, lactate, lower substituted derivatives thereof, and mixtures thereof. Optional inorganic ions include sodium, sulfate, nitrate and chloride ions. A non-exhaustive list of representative examples of chromic compounds include: $[Cr_3(CH_3CO_2)_6(OH)_2]^{1+}$, $[Cr_3(OH)_2(CH_3CO_2)_6]NO_3 \cdot 6H_2O$, $[Cr_3(H_2O)_2(CH_3CO_2)_6]^{3+}$, and $[Cr_3(H_2O)_2(CH_3CO_2)_6](CH_3CO_2)_3 \cdot H_2O$.

A host of complexes of the type described above and their method of preparation are well known in the leather tanning art. These complexes are described in Shuttleworth and Russel, Journal of The Society of Leather Trades' Chemists, "The Kinetics of Chrome Tannage Part I.," United Kingdom, 1965, v. 49, p. 133-154; "Part III.," United Kingdom, 1965, v. 49, p. 251-260; "Part IV.," United Kingdom, 1965, v. 49, p. 261-268; and Von Erdman, Das Leder, "Condensation of Mononuclear Chromium (III) Salts to Polynuclear Compounds," Eduard Roether Verlag, Darmstadt, Germany, 1963, v. 14, p. 249; and are incorporated herein by reference. Udy, Marvin J., Chromium, Volume 1: Chemistry of Chromium and its Compounds, Reinhold Publishing Corp., N.Y., 1956, pp. 229-233; and Cotton and Wilkinson, Advanced Inorganic Chemistry 3rd Ed., John Wiley & Sons, Inc., N.Y., 1972, pp. 836-839, further describe typical complexes which may be within the scope of the present invention and are incorporated herein by reference. The present invention is not limited to the specific complexes and mixtures thereof described in the references, but may include others satisfying the above-stated definition.

Gel Delaying Agents

The gelation delaying agent is a monocarboxylic acid or a monocarboxylic acid salt or mixtures thereof in sufficient concentration to raise or lower the pH of the aqueous gelation solution to about 3.5 to about 6.8, preferably about 3.5 to about 6 and most preferably about 3.5 to about 5. Exemplary acids include formic, acetic, propionic, lactic, etc. Exemplary acid salts include salts of formate, acetate, propionate, lactate, etc.

In addition to the delaying agent, the buffer is any water soluble buffer subsystem having a pKa value between about 3.5 and about 6.8. In certain embodiments, the buffer subsystem has a pKa value between about 3.5 and about 6. In other embodiments, the buffer subsystem has a pKa value between about 3.5 to about 5. Exemplary buffers include monocarboxylates such as formate, acetate, propionate and lactate salts, hydrogen phosphates and polyamines such as triethylene tetraamine, tetraethylene pentamine and hexamethylene tetraamine or mixtures thereof. Dicarboxylate and tricarboxylate buffers such as those based on the use of malonic, oxalic and citric acids should be avoided because the closely spaced dicarboxylates and tricarboxylates strongly chelate the chromium (III) gelation agent thereby preventing gelation.

A molar ratio of the delaying subsystem to the crosslinkable polymer subsystem ranges between about 0.1:1 and about 3.0:1. In certain embodiments, the molar ratio is between about 0.5:1 and -about 2.5:1. In certain embodiments, the molar ratio is between about 0.75 to 1 and about 2.0:1.

The crosslinkable polymer system, the crosslinking system, the crosslink delaying subsystem, and the solvent system can be mixed at or near the wellhead by in-line mixing means before or during injection. Or, the delaying system, polymer system and the solvent system can be admixed and then the crosslinking system added to form a bulk gel composition suitable for injection. Sequential injection should not be used because it results in inadequate mixing and subsequent incomplete gelation.

Suitable solvent system for use the present invention include, without limitation, fresh water or brine. Exemplary fresh water include tap water, production water, or any other source of free water. Exemplary brine include any water containing an inorganic or organic salt dissolved in the water including brines containing salts up their solubility limit in water.

Dissolution Fluids

Suitable hydrocarbon base fluids for use in this invention includes, without limitation, synthetic hydrocarbon fluids, petroleum based hydrocarbon fluids, natural hydrocarbon (non-aqueous) fluids or other similar hydrocarbons or mixtures or combinations thereof. The hydrocarbon fluids for use in the present invention have viscosities ranging from about $5 \times 10^{-6}$ to about $600 \times 10^{-6}$ m$^2$/s (5 to about 600 centistokes). Exemplary examples of such hydrocarbon fluids include, without limitation, polyalphaolefins, polybutenes, polyesters, biodiesels, simple low molecular weight fatty esters of vegetable or vegetable oil fractions, simple esters of alcohols such as Exxate from Exxon Chemicals, vegetable oils, animal oils or esters, other essential oil, diesel, diesel having a low or high sulfur content, kerosene, jet-fuel, white oils, mineral oils, mineral seal oils, hydrogenated oil such as PetroCanada HT-40N or IA-35 or similar oils produced by Shell Oil Company, internal olefins (TO) having between about 12 and 20 carbon atoms, linear alpha olefins having between about 14 and 20 carbon atoms, polyalpha olefins having between about 12 and about 20 carbon atoms, isomerized alpha olefins (IAO) having between about 12 and about 20 carbon atoms, VM&P Naptha, Linpar, Parafins having between 13 and about 16 carbon atoms, and mixtures or combinations thereof.

Suitable polyalphaolefins (PAOs) include, without limitation, polyethylenes, polypropylenes, polybutenes, polypentenes, polyhexenes, polyheptenes, higher PAOs, copolymers thereof, and mixtures thereof. Exemplary examples of PAOs include PAOs sold by Mobil Chemical Company as SHF fluids and PAOs sold formerly by Ethyl Corporation under the name ETHYLFLO and currently by Albemarle Corporation under the trade name Durasyn. Such fluids include those specified as ETYHLFLO 162, 164, 166, 168, 170, 174, and 180. Well suited PAOs for use in this invention include bends of about 56% of ETHYLFLO now Durasyn 174 and about 44% of ETHYLFLO now Durasyn 168.

Exemplary examples of polybutenes include, without limitation, those sold by Amoco Chemical Company and Exxon Chemical Company under the trade names INDOPOL and PARAPOL, respectively. Well suited polybutenes for use in this invention include Amoco's INDOPOL 100.

Exemplary examples of polyolester include, without limitation, neopentyl glycols, trimethylolpropanes, pentaerythriols, dipentaerythritols, and diesters such as dioctylsebacate (DOS), diactylazelate (DOZ), and dioctyladipate.

Exemplary examples of petroleum based fluids include, without limitation, white mineral oils, paraffinic oils, and medium-viscosity-index (MVI) naphthenic oils having viscosities ranging from about $5 \times 10^{-6}$ to about $600 \times 10^{-6}$ m$^2$/s (5 to about 600 centistokes) at 40° C. Exemplary examples of white mineral oils include those sold by Witco Corporation, Arco Chemical Company, PSI, and Penreco. Exemplary examples of paraffinic oils include solvent neutral oils available from Exxon Chemical Company, high-viscosity-index (HVI) neutral oils available from Shell Chemical Company, and solvent treated neutral oils available from Arco Chemical Company. Exemplary examples of MVI naphthenic oils include solvent extracted coastal pale oils available from Exxon Chemical Company, MVI extracted/acid treated oils available from Shell Chemical Company, and naphthenic oils sold under the names HydroCal and Calsol by Calumet and hydrogenated oils such as HT-40N and IA-35 from PetroCanada or Shell Oil Company or other similar hydrogenated oils.

Exemplary examples of vegetable oils include, without limitation, castor oils, corn oil, olive oil, sunflower oil, sesame oil, peanut oil, palm oil, palm kernel oil, coconut oil, butter fat, canola oil, rape seed oil, flax seed oil, cottonseed oil, linseed oil, other vegetable oils, modified vegetable oils such as crosslinked castor oils and the like, and mixtures thereof. Exemplary examples of animal oils include, without limitation, tallow, mink oil, lard, other animal oils, and mixtures thereof. Other essential oils will work as well. Of course, mixtures of all the above identified oils can be used as well.

Hydrocarbon Soluble Polymers

Suitable polymers for use as anti-settling additives or polymeric suspension agents in this invention include, without limitation, linear polymers, block polymers, graft polymers, star polymers or other multi-armed polymers, which include one or more olefin monomers and/or one or more diene monomers and mixtures or combinations thereof. The term polymer as used herein refers to homo-polymers, co-polymers, polymers including three of more monomers (olefin monomers and/or diene monomers), polymer including oligomeric or polymeric grafts, which can comprise the same or different monomer composition, arms extending form a polymeric center or starring reagent such as tri and tetra valent linking agents or divinylbenzene nodes or the like, and homo-polymers having differing tacticities or microstructures. Exemplary examples are styrene-isoprene copolymers (random or block), triblocked, multi-blocked, styrene-butadiene copolymer (random or block), ethylene-propylene copolymer (random or block), sulphonated polystyrene polymers, alkyl methacrylate polymers, vinyl pyrrolidone polymers, vinyl pyridine, vinyl acetate, or mixtures or combinations thereof.

Suitable olefin monomer include, without limitation, any monounsaturated compound capable of being polymerized into a polymer or mixtures or combinations thereof. Exemplary examples include ethylene, propylene, butylene, and other alpha olefins having between about 5 and about 20 carbon atoms and sufficient hydrogens to satisfy the valency requirement, where one or more carbon atoms can be replaced by B, N, O, P, S, Ge or the like and one or more of the hydrogen atoms can be replaced by F, Cl, Br, I, OR, SR, COOR, CHO, C(O)R, C(O)NH2, C(O)NHR, C(O)NRR', or other similar monovalent groups, polymerizable internal mono-olefinic monomers or mixtures or combinations thereof, where R and R' are the same or different and are carbyl group having between about 1 to about 16 carbon atoms and where one or more of the carbon atoms and hydrogen atoms can be replaced as set forth immediately above.

Suitable diene monomer include, without limitation, any doubly unsaturated compound capable of being polymerized into a polymer or mixtures or combinations thereof. Exemplary examples include 1,3-butadiene, isoprene, 2,3-dimethyl butadiene, or other polymerizable diene monomers.

The inventors have found that Infineum SV150, an isoprene-styrene di-block and starred polymer, offers superior permanent shear stability and thickening efficiency due to its micelle forming nature.

Well Treatments

Suitable well treatments include, without limitation, any well treatment that may be diverted through the diversions layers of this invention. Exemplary treatments include sand control treatments, aggregating treatments, and zeta modifying treatments such as SandAid/zeta potential, sticky/tacky materials such as SandWedge, sand consolidation/formation consolidation treatments, where monomers are pumped through filter cake and then polymerize in situ to consolidate the formation such as thermal epoxy, furan, phenolic resins, etc., scale inhibitor treatments, paraffin inhibitor treatments, wettability modifier treatments, biocide treatments, gel breaker treatments, enzyme treatments, defoamer treatments, acid treatments, and mixtures or combinations thereof. For injection wells, the filter cake will allow even surfactant and polymer flooding treatments to be pumped through the filter cake into the formation which also experiences the same uneven permeability issues.

COMPOSITIONAL RANGES

Thickening Agent Compositional Ranges—Water Based Fluids

The hydratable polymer may be present in the fluid in concentrations ranging between 0.001 wt. % and about 5.0 wt. % of the aqueous fluid. In other embodiments, the range is between about 0.01 wt. % and about 4 wt. %. In yet other embodiments, the range is between about 0.1% and about 2.5 wt. %. In certain other embodiments, the range if between about 0.20 wt. % and about 0.80 wt. %.

Thickening Agent Compositional Ranges—Oil Based Fluids

The hydratable polymer may be present in the fluid in concentrations ranging between 0.001 wt. % and about 5.0 wt. % of the oil based fluid including a base oil. In other embodiments, the range is between about 0.01 wt. % and about 4 wt. %. In yet other embodiments, the range is between about 0.1% and about 2.5 wt. %. In certain other embodiments, the range if between about 0.20 wt. % and about 0.80 wt. %

Cross-Linking System Compositional Ranges

In other embodiments, the crosslinking agents is present in a range of from about 10 ppm to about 1000 ppm of metal ion of the crosslinking agent in the hydratable polymer fluid. In some applications, the aqueous polymer solution is cross-linked immediately upon addition of the crosslinking agent to form a highly viscous gel. In other applications, the reaction of the crosslinking agent can be retarded so that viscous gel formation does not occur until the desired time.

Historically, companies in the industry have been combining borate ions and organozirconate in cross-linking systems for cross-linking CMHPG gel systems in order to show higher surface cross-linking properties. For example, U.S. Pat. No. 6,214,773 disclosed an improved high temperature, low residue viscous well treating fluid comprising: water; a hydrated galactomannan thickening agent present in said treating fluid in an amount in the range of from about 0.12% to about 0.48% by weight of said water in said treating fluid; a retarded cross-linking composition for buffering said treating fluid and cross-linking said hydrated galactomannan thickening agent comprised of a liquid solvent comprising a mixture of water, triethanolamine, a polyhydroxyl containing compound and isopropyl alcohol, an organotitanate chelate or an organozirconate chelate and aborate ion producing compound, said retarded cross-linking composition being present in said treating fluid in an amount in the range of from about 0.04% to about 1.0% by weight of water in said treating fluid; and a delayed gel breaker for causing said viscous treating fluid to break into a thin fluid present in said treating fluid in an amount in the range of from about 0.01% to about 2.5% by weight of water in said treating fluid.

The cross-linking compositions of this invention generally have a mole ratio of a borate of a borate generating compound and a transition metal alkoxide between about 10:1 and about 1:10. In certain embodiments, the mole ratio is between about 5:1 and about 1:5. In other embodiments, the mole ratio is between about 4:1 and 1:4. In other embodiments, the mole ratio is between about 3:1 and 1:3. In other embodiments, the mole ratio is between about 2:1 and 1:2. And, in other embodiments, the mole ratio is about 1:1. The exact mole ratio of the reaction product will depend somewhat on the conditions and system to which the composition is to be used as will be made more clear herein. While the cross-linking systems of this invention includes at least one cross-linking agent of this invention, the systems can also include one or more conventional cross-linking agents many of which are listed herein below.

FILTER CAKE OR FILTER LAYER FORMATION AND ARRAN

Referring now to FIG. 1, an embodiment of a diversion system for diverting a treating fluid into a producing interval of a vertically oriented well, generally 100, is shown to include a bore hole 102 in the earth through a non-producing formation 104 into a producing interval 106 having different geological strata 108. The system 100 includes casing 110, a working string or production tubing 112 and a packer 114 to isolate the interval 106 from the non-producing formation 104. The system 100 also includes a controlled permeability layer 116 formed on a surface 118 of the interval 106. The diversion layer 116 has controlled permeability either due to the particle size distribution of the material comprising the layer 116 or produced in the layer 116 by dissolving or eroding dissolvable or erodible components in the layer 116. As a treating fluid 120 such as a sand control fluid or other well treating fluid is pumped into the working string or production stream 112, the fluid 120 passes through the layer 116 and is diverted or spread out forming diversion jets 122 improving treating coverage, completeness and/or uniformity. Thus, the layer 116 evens out the effective permeability of segments of the formation so that the permeability of the entire formation surface is the same or substantially the same, where the term substantially means that the permeability from point to point along the formation differs by no more than 500%. In certain embodiments, the permeability differs by no more the 50%. In other embodiments, the permeability differs by no more than 25%. In other embodiments, the permeability differs by no more than 10%.

Figure 2:
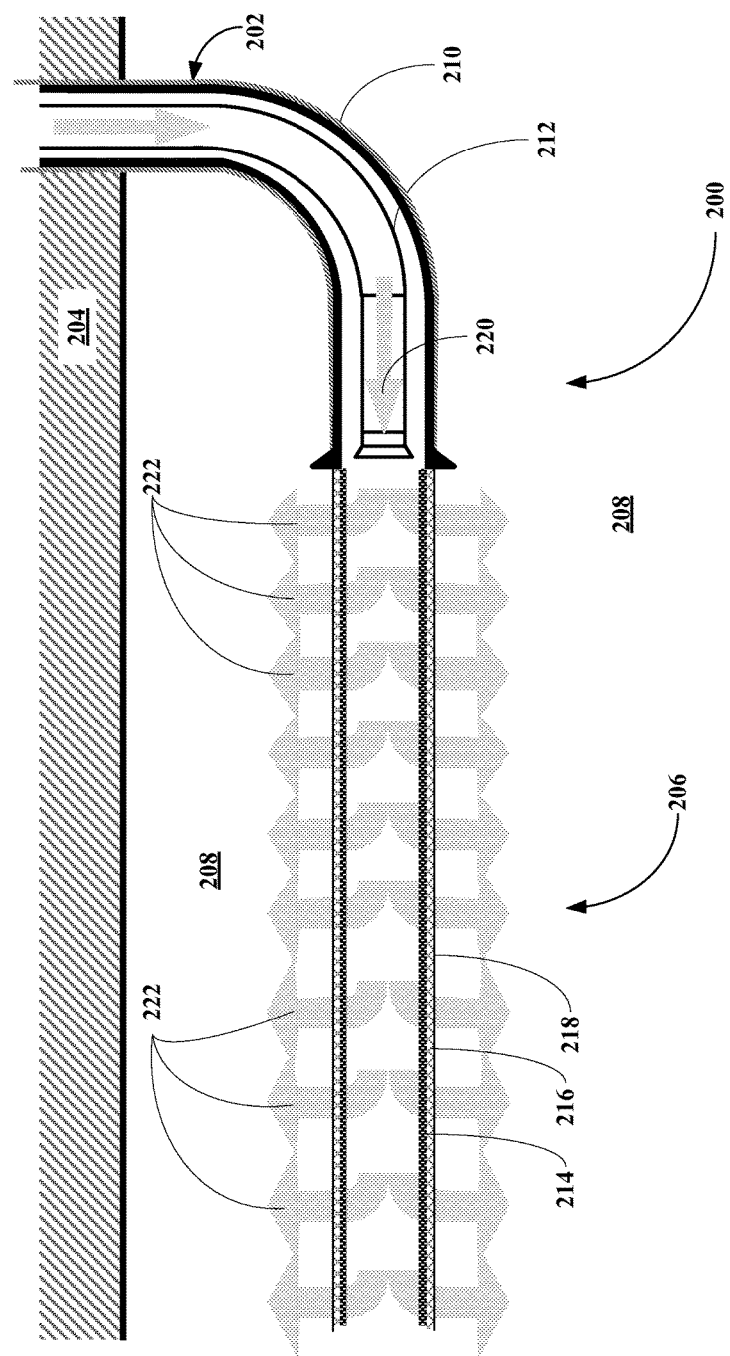
FIG. 2 depicts an embodiment of a horizontally disposed well having a long producing interval including one diversion layer showing the diverted flow of treating material into the formation.

Referring now to FIG. 2, an embodiment of a diversion system for diverting a treating fluid into a well having an extended producing horizontal interval, generally 200, is shown to include a bore hole 202 in the earth through a non-producing formation 204 into an extended producing interval 206 of a geological stratum 208. The system 200 includes casing 210, a working string or production tubing 212. The system 200 also includes a controlled permeability layer 214 formed on a screen 216 disposed adjacent the interval 206. The diversion layer 214 has controlled permeability either due to the particle size distribution of the material comprising the layer 214 or produced in the layer 214 by dissolving or eroding dissolvable or erodible components in the layer 214. As a treating fluid 218 such as sand and/or water control fluid is pumped into the working string 212, passes through the layer 216 and is diverted or spread out into the interval 206 forming diversion jets 220 as it passes through the layer 214 and the screen 216 improving treating coverage, completeness and/or uniformity.

Diverted Formations

Figure 3A:
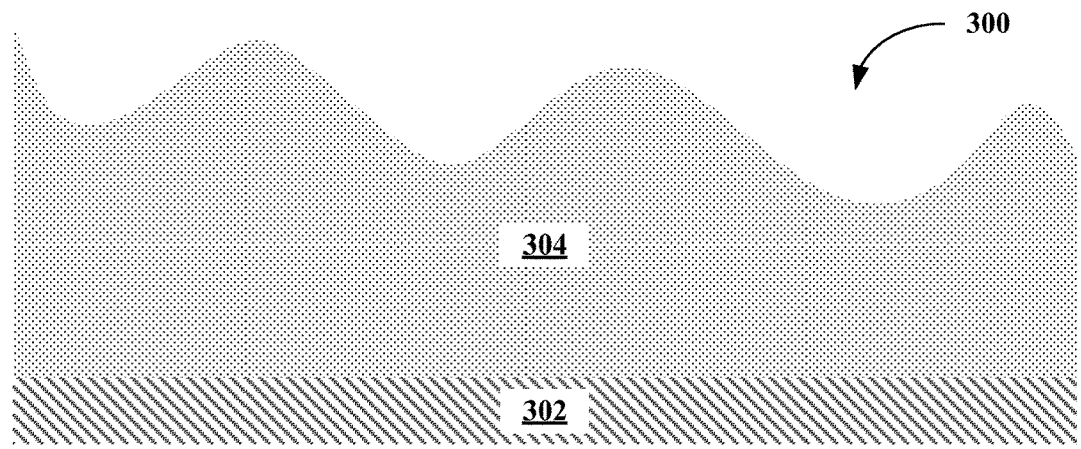
FIGS. 3A-C depict embodiments of diverted formations.

Referring now to FIG. 3A, an embodiment of a diverted formation of the present invention, generally 300, is shown to include a producing formation 302. The producing formation 302 has formed or deposited thereon a diversion layer 304. The diversion layer 304 is shown here to be of non-uniform thickness across the portion of the producing formation 302 shown and having a first porosity. In this embodiment, the thickness may vary up to ±50% of an average thickness of the diversion layer 304.

Figure 3B:
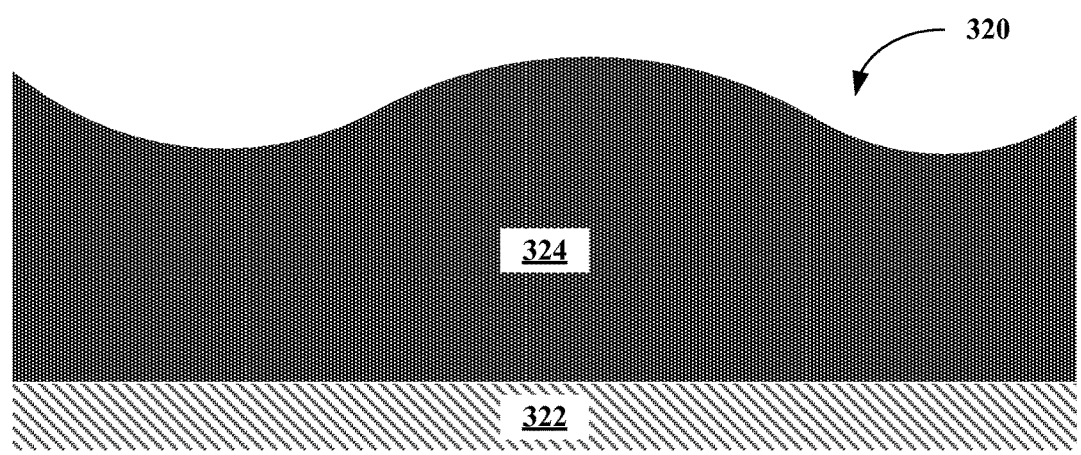

Referring now to FIG. 3B, another embodiment of an embodiment of a diverted formation of the present invention, generally 320, is shown to include a producing formation 322. The producing formation 322 has formed or deposited thereon a diversion layer 324. The diversion layer 324 is shown here to be of more uniform thickness across the portion of the producing formation 322 shown, but having a consistent waved surface—uniform variations in layer thickness—and having a second porosity. In this embodiment, the thickness may vary up to ±25% of an average thickness of the diversion layer 324. In this embodiments, the wavelength of the waved surface is between about 50 cm and 10 m.

Figure 3C:
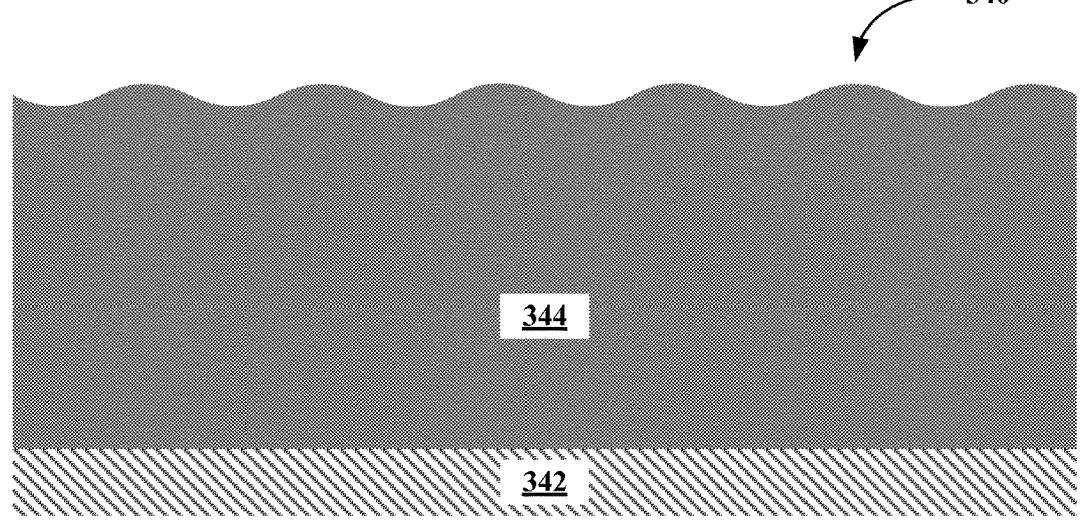

Referring now to FIG. 3C, another embodiment of a diverted formation of the present invention, generally 340, is shown to include a producing formation 342. The producing formation 342 has formed or deposited thereon a diversion layer 344. The diversion layer 344 is shown here to be of a more uniform thickness across the portion of the producing formation 342 shown, but having a consistent waved surface with smaller waves—smaller uniform variations in the layer thickness and having a third porosity. In this embodiment, the thickness may vary up to ±10% of an average thickness of the diversion layer 344. In this embodiments, the wavelength of the waved surface is between about 1 cm and 50 cm.

Referring now to FIG. 4A, another embodiment of a diverted formation of the present invention, generally 400, is shown to include a producing formation 402. The diverted formation 400 includes a screen assembly 404 disposed on the formation 402. The diverted formation 400 also includes a diversion layer 406 formed on the screen assembly 404, where the diversion layer 406 comprises particles having a larger diameter than the openings of the screen assembly 404.

Referring now to FIG. 4B, another embodiment of a diverted formation of the present invention, generally 450, is shown to include a producing formation 452. The diverted formation 450 includes a screen assembly 454 disposed on the formation 452. The diverted formation 450 also includes a diversion layer 456 disposed between the screen assembly 454 and the formation 452. In this case, the diversion layer 456 comprises particles having a smaller diameter than the openings of the screen assembly 454. The layer 456 is formed by depositing a diversion composition 458 on the screen assembly 454. The composition 458 then flows through the screen assembly 458 to form the layer 456.

Figure 5:
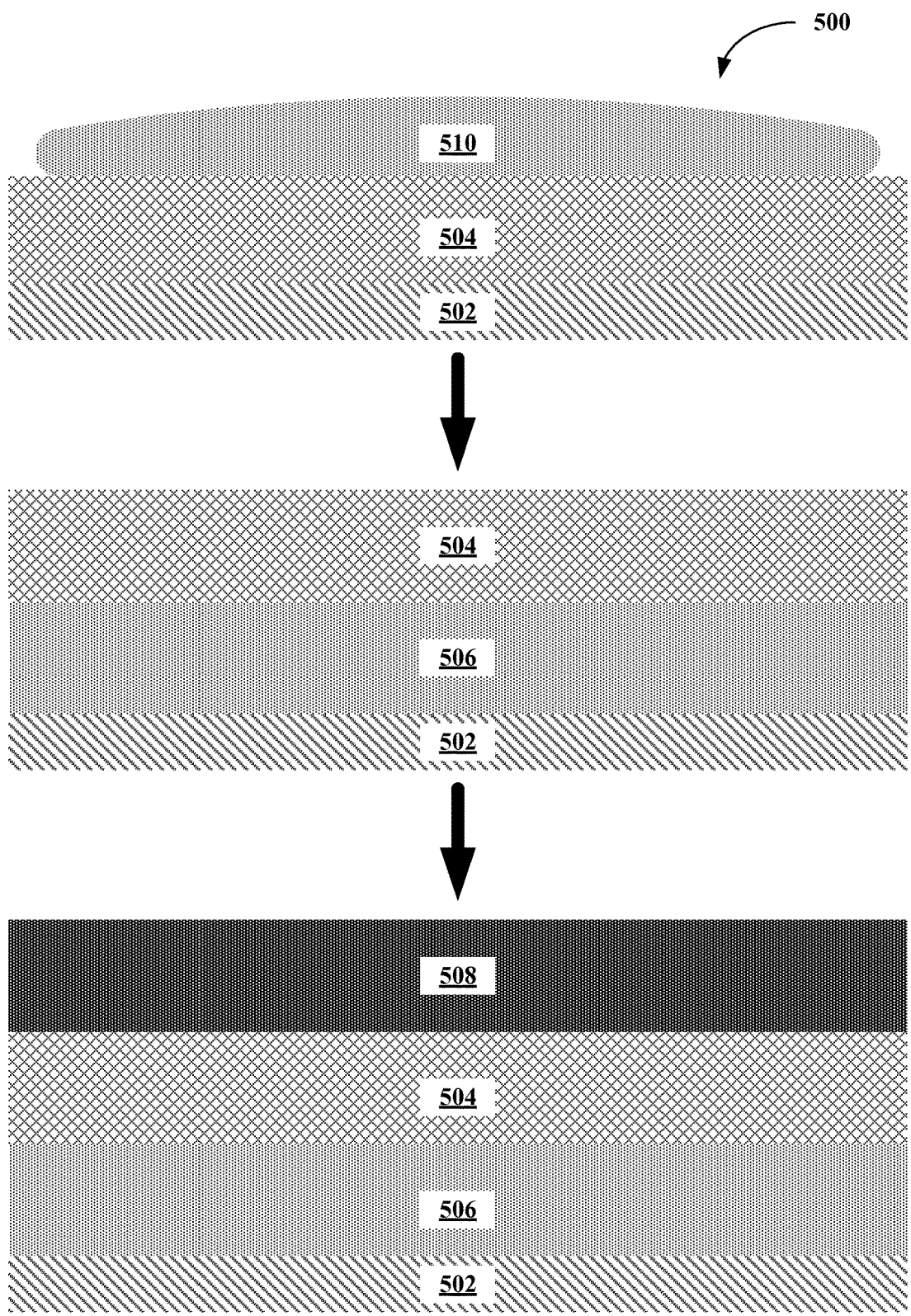
FIG. 5 depicts another embodiment of diverted formations and methods for preparing the diverted formation.

Referring now to FIG. 5, another embodiment of a diverted formation of the present invention, generally 500, is shown to include a producing formation 502. The diverted formation 500 includes a screen assembly 504 disposed on the formation 502. The diverted formation 500 also includes a first diversion layer 506 interposed between the formation 502 and the screen assembly 504, and a second diversion layer 508 formed on the screen assembly 504, where the first diversion layer 506 comprises particles having a smaller larger diameter than the openings of the screen assembly 504 and the second diversion layer 508 comprises particles having a larger diameter than the openings of the screen assembly 504. The first diversion layer 506 is formed by depositing a first diversion composition 510 on the surface of the screen assembly 504, which then flows through the screen assembly 504 to form the first diversion layer 506, while the second layer 508 is simple deposed on the screen assembly 504.

Referring now to FIG. 6, another embodiment of a diverted formation of the present invention, generally 600, is shown to include a producing formation 602. The diverted formation 600 includes a diversion layer 604 formed on the formation 602. Once formed on the formation 602, the diversion layer 604 is treated with a solution 606, which removes dissolvable or erodible components in the layer composition changing the porosity of the layer 608.

Prior Art Treatments without Diversion Layer

Referring now to FIG. 7, an illustration of a prior art treatment of a producing formation without a diversion layer, generally 700, is shown to include a producing formation 702. A treating composition 704 is then applied to the formation 702. Because the formation 702 does not include a diversion layer, the treating composition 704 penetrates the formation 702 in solution channels 706, while the channels 706 are exaggerated; the figure is designed to illustrate the non-uniformity of the treatment.

Present Treatments with a Diversion Layer

Figure 8:
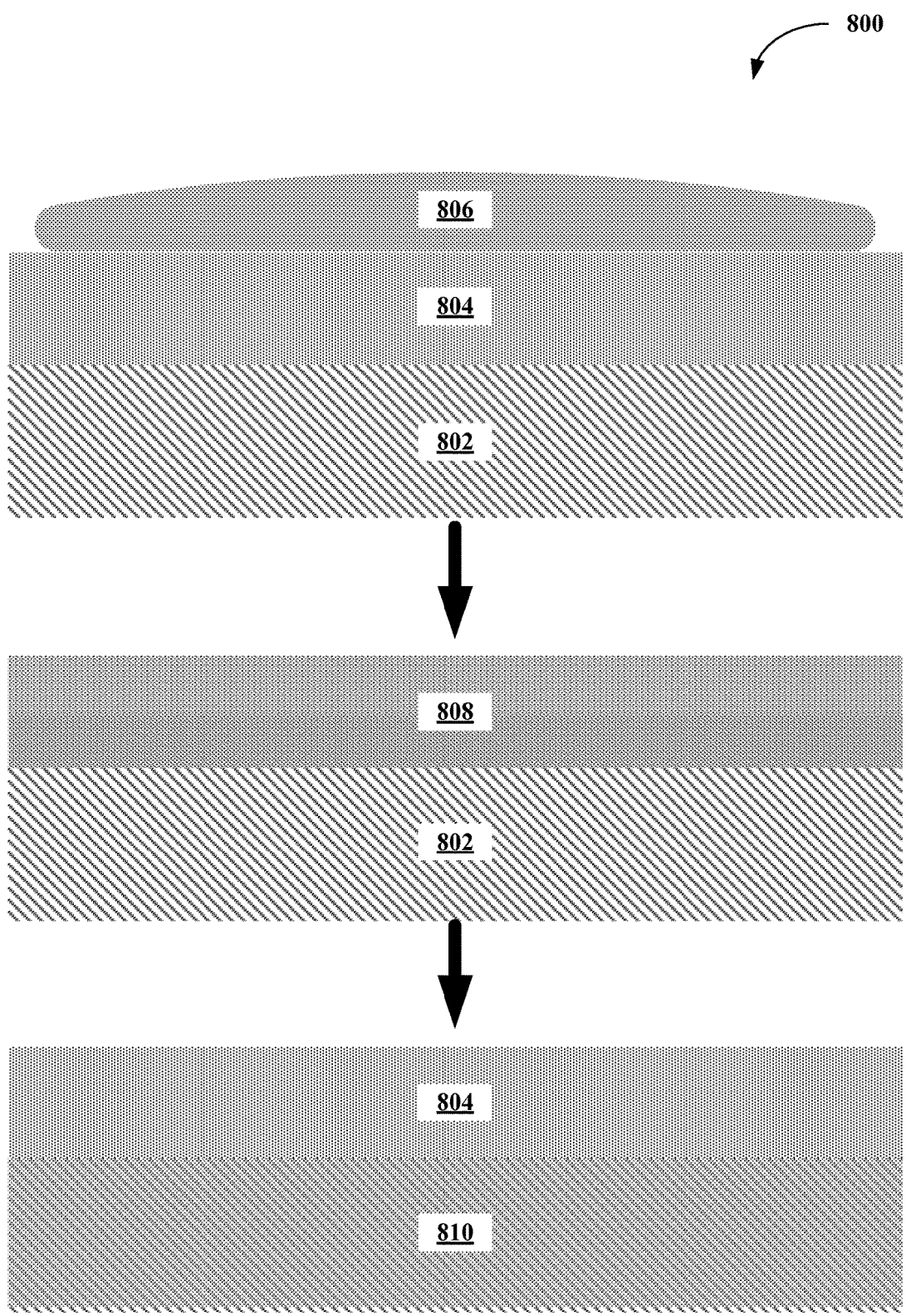
FIG. 8 illustrates a treatment of a formation including a diversion layer deposited on the formation prior to treatment.
Figure 8:
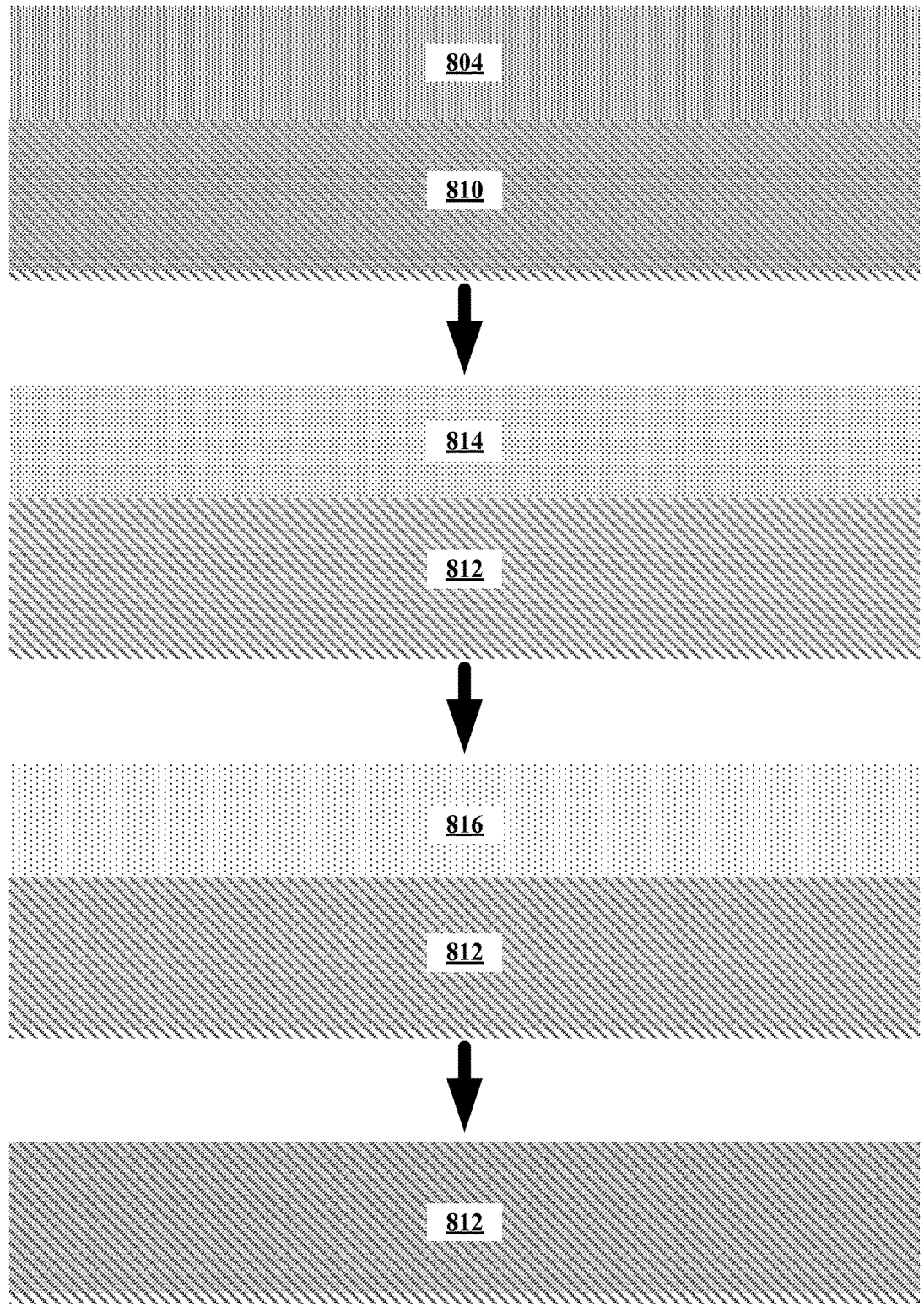

Referring now to FIG. 8, an illustration of a treatment of a producing formation having a diversion layer of this invention, generally 800, is shown to include a producing formation 802 having a diversion layer 804 formed on the formation 802. A treating composition 806 is then applied to the diversion layer 804 of the formation 802. The treating composition 806 is diverted through the diversion layer 804 to form a diverting layer 808. Because the formation 802 includes the diversion layer 804, the treating composition 806 enters the formation 802 from the diverting layer 808 in a more uniform manner to form a treated formation 810. Once the treating composition 806 has penetrated the formation 802 to the extent desired, flow back of the treating solution 806 leaves a permanent treated formation 812. Once treatment flow back has occurred, the flow back and production from the formation 802 will begin to erode the diversion layer 804 forming partially eroded layer 814, further eroded layer 816, until the layer 804 is fully removed.

EXPERIMENTS OF THE INVENTION

Introduction

Figure 9:
FIG. 9 depicts a representation of a well with zones of largely varying permeability.

Sand production from oil and/or gas wells may lead to damage or plugging of screens, tubulars, and surface equipment and may necessitate costly maintenance or work over operations. Various mechanical and chemical treatments are available to mitigate this problem including zeta potential or aggregation modifying agent products such as SandAid available from Weatherford. Remedial pumping of zeta potential or aggregation modifying agents into a formation or formation zone may decrease sand production and increase the maximum sand free rate at which a well may produce. Great success has been achieved in the matrix treatment of short intervals with sand control, scale inhibitor, paraffin inhibitor, acidizing and other treatments. However, proper placement of such treatments becomes much more difficult in long horizontal wells for two main reasons. First, too large of a pressure drop along the well will lead to insufficient treatment towards the end of the wellbore. Second, such wells typically have a high variability in permeability along the formation. FIG. 9 shows a representation of varying permeability across an interval, which is common with long horizontal wells. In such cases, a majority of any treatment fluid leaks off into high permeability zones and not enough enter lower permeability zones. This situation is generally exacerbated if a high permeability region (thief zone) is located towards the heel of the well, leading to even more leak-off at the beginning of the well, or if there are any natural fractures in the formation.

In order to properly treat a well with this configuration, it is necessary to divert some treatment fluid away from high permeability zones or segments to lower permeability zones or segments. The methods of this invention provide treatments for long horizontal wells by depositing or building up a controlled-permeability filter cake on an inside of the wellbore and then pumping the treatment through the filter cake. If the filter cake permeability is engineered correctly, then the effective permeability across the formation should be substantially even, leading to the even treatment to each zone. The term substantially here means that the permeability across the formation differs by no more that 500%. In certain embodiments, the permeability across the formation differs by no more than 250%. In certain embodiments, the permeability across the formation differs by no more than 100%. In certain embodiments, the permeability across the formation differs by no more than 50%. In certain embodiments, the permeability across the formation differs by no more than 25%. In other embodiments, the permeability across the formation differs by no more than 10%. In other embodiments, the permeability across the formation differs by no more than 5%.

Results and Discussions

Test Filter Cake Formation and Permeability

Figure 10A:
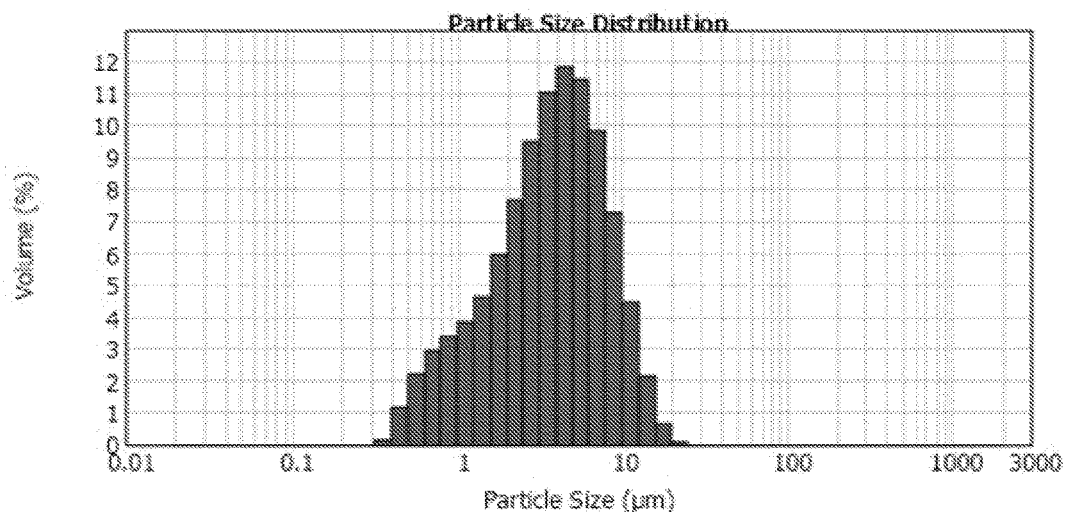
FIGS. 10A-C depicts a particle size distributions for A) Wel-Carb 2 ($D_{50}$=3.8 μm), B) Wel-Carb 25 ($D_{50}$=21.5 μm), and C) Wel-Carb 50 ($D_{50}$=39.6 μm).
Figure 10B:
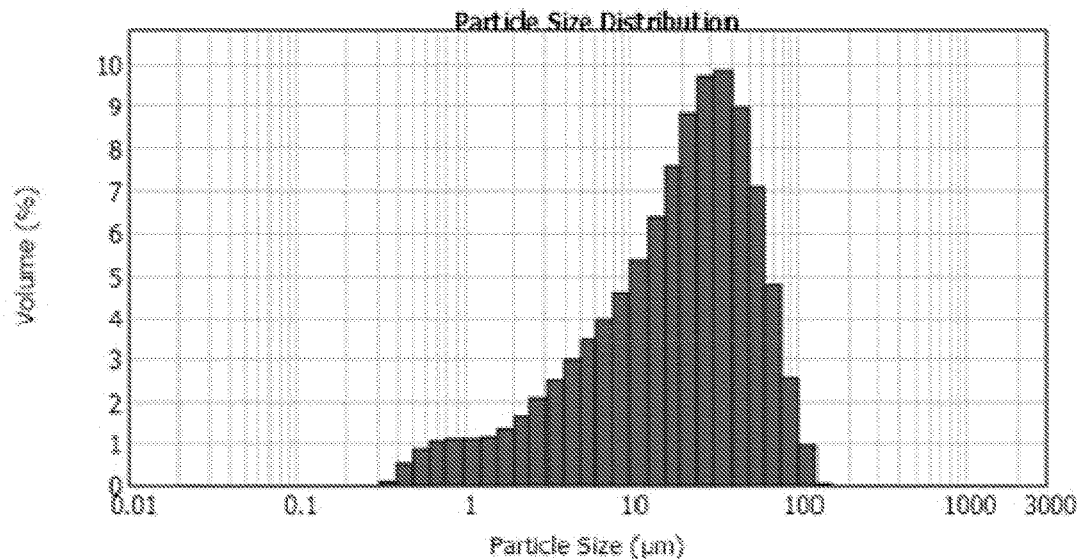
Figure 10C:
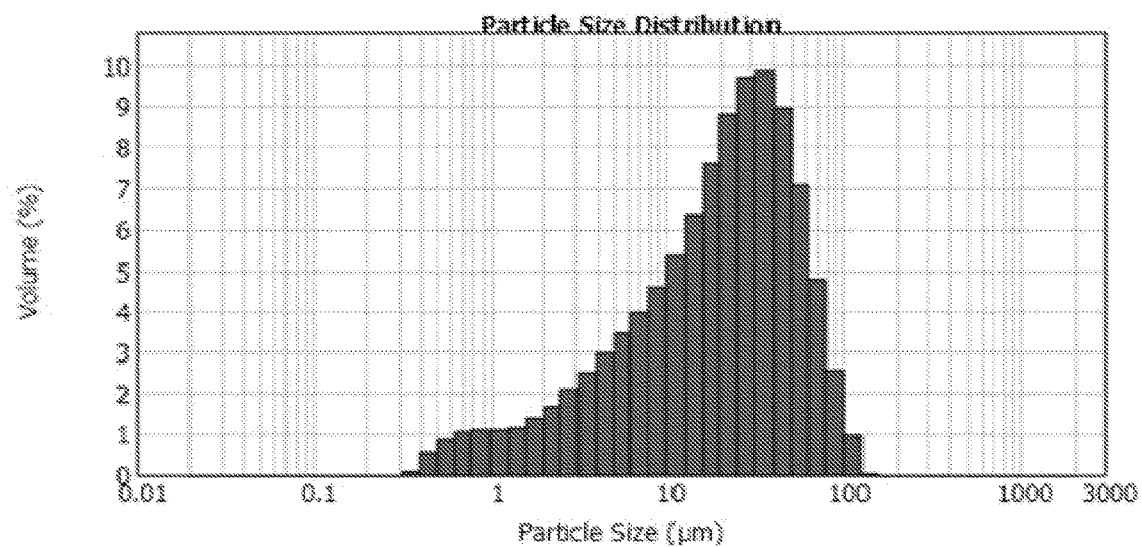

The permeability and particle size requirements for the filter cakes or layers were tested experimentally. Assuming a lowest permeability zone of 100 mD, the filter cake should have a permeability at least this low. However, initial modeling suggested that a filter cake permeability of about 1 mD to about 50 mD may be adequate. We approximated material particle size distributions to achieve a 50 mD filter cake using the Rumpf-Gupte approximation for packed spheres, which gave a particle size of about 9 µm. However, samples of real filter cake materials always have a particle size distribution, which will affect filter cake permeability. Actual particle size distributions for several batches of sized calcium carbonate used for drilling fluids applications are shown in FIGS. 10A-C. These samples show a relatively broad particle size distribution which is beneficial for bridging a wide distribution of pore throat diameters that are seen in real formations.

The filter cake permeability was determined by plotting brine flow vs time through a filter cake formed in a 350 mL filter press. Results for three are described calcium carbonate samples is given in FIGS. 11A-C.

Figure 11A:
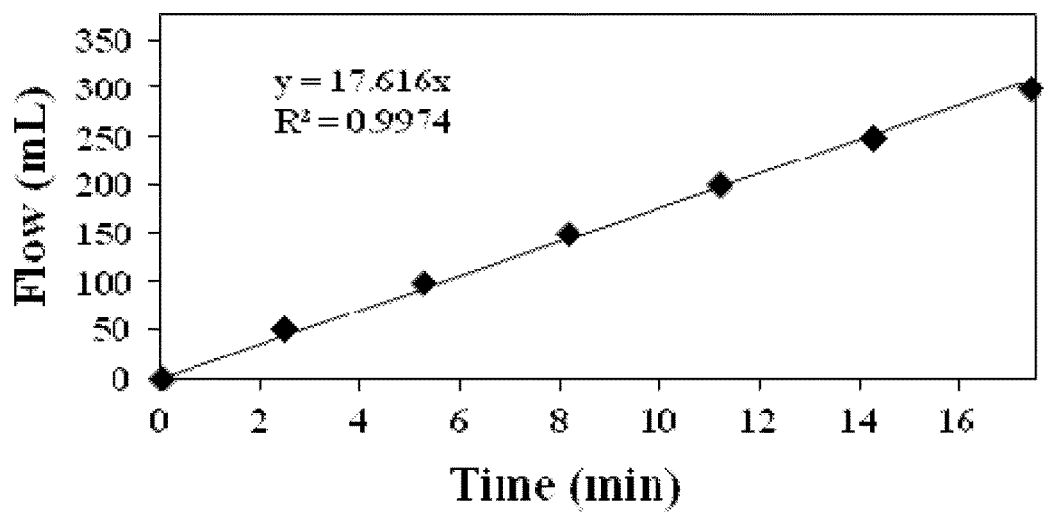
FIGS. 11A-C depicts a calculation of filter cake permeability from flow vs time data for the materials of FIGS. 10A-C.
Figure 11B:
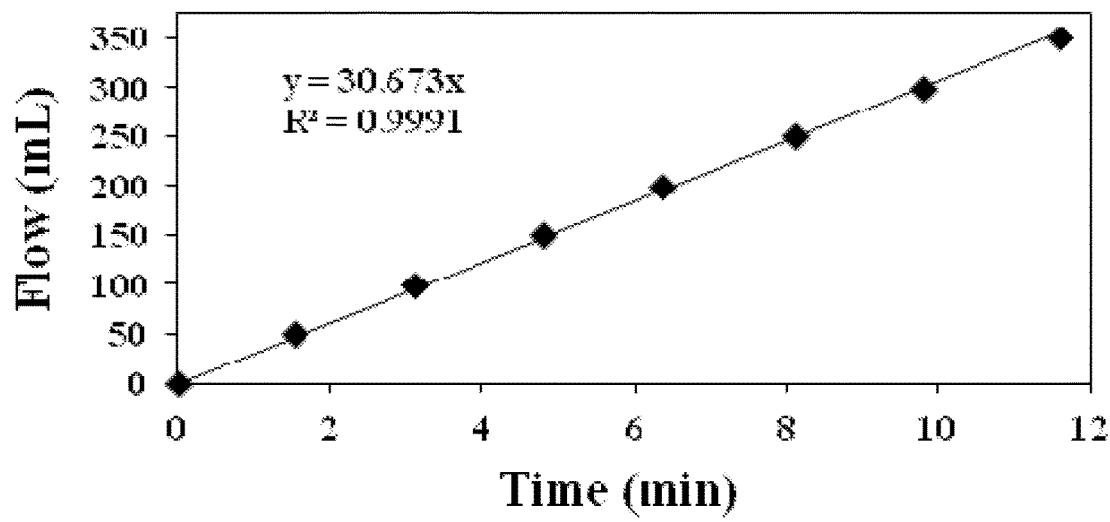
Figure 11C:
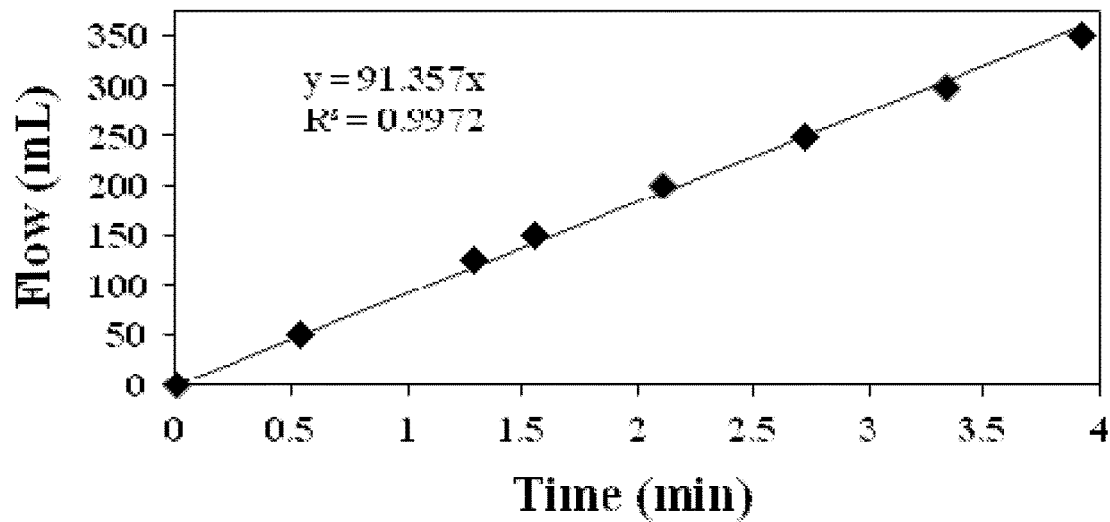

The results shown in FIGS. 11A-C clearly demonstrate that filter cake permeability may be controlled by choosing the correct particle size. Indeed, the targeted range of about 5 mD to about 50 mD was covered well with calcium carbonate $D_{50}$ having particles ranging from about 4 µm to about 40 µm. The substrate for these experiments was a ceramic disk with permeability of about 2500 mD indicating that the filter cake is capable of forming on high permeability zones.

Test Treatment Through Filter Cake

A method was developed to inject zeta potential or aggregation modifying agents, or other treatments, on-the-fly to create a turbulent environment to provide adequate mixing. The degree of turbulence in a flow path is principally determined by flow rate and pipe diameter (as well as fluid viscosity, pipe surface smoothness, and temperature). In order to generate turbulent flow, a lower inner-diameter capillary tube was used. Thus, sand control agents or treatments with reduced aqueous solubility would have to be injected on-the-fly at a high rate into a brine stream and flown through the filter cake as shown schematically in FIG. 12.

The sand control chemical was injected on the fly and passed through the filter cake in a modified filter press. The effluent was collected into a beaker containing sand and brine and the sand mixed manually. The results of this experiment clearly showed that the sand control agents penetrated the filter cake and were still capable of agglomerating sand afterwards.

Test Removal of the Filter Cake

After the diverting filter cake had been formed and zeta potential or aggregation modifying agents have been pumped therethrough, we demonstrated that the filter cake were removable, while minimizing damage to the formation. While calcium carbonate is easily removable with acid treatment, decomposing to water, carbon dioxide, and calcium ions, zeta potential or aggregation modifying agents are known to be sensitive to acidic conditions and work best around neutral pH.

We demonstrated that a buffered acetic acid system based on a 10% acetic acid solution brought to pH 4.5, pH 4.75, and pH 5 using sodium hydroxide were effective in filter cake removal. A zeta potential or aggregation modifying agent treatment was carried out and the agglomerated sand was then treated overnight with each acetate buffer solution. The results showed that the samples treated with the buffers held together upon bottle inversion, retaining their agglomeration ability.

Build a Model Horizontal Well Apparatus

Figure 13:
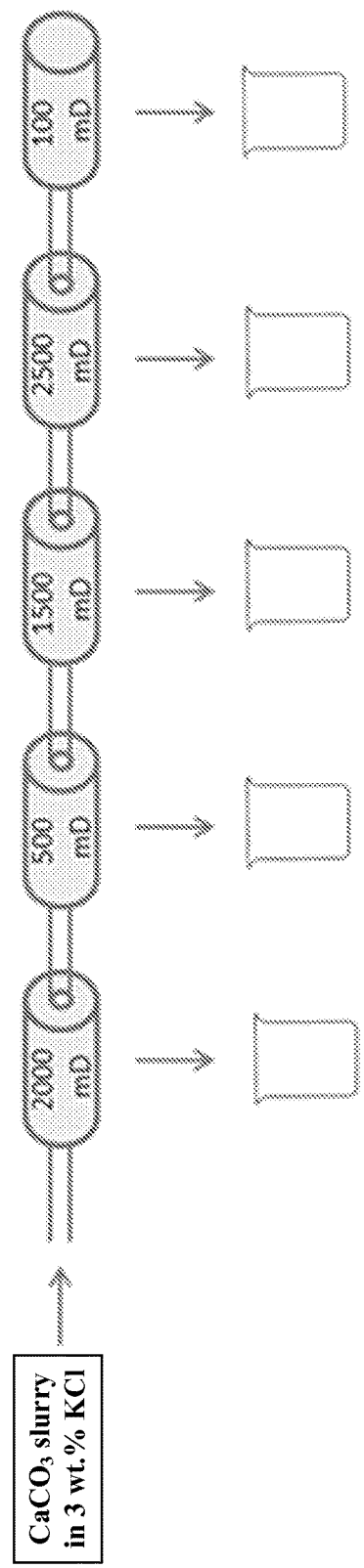
FIG. 13 depicts a general design of horizontal well model apparatus.

In order to test the feasibility of the diverting filter cake concept, we built an apparatus to model a horizontal well with zones having different permeabilities. The general design of the apparatus is shown in FIG. 13. Each zone in the well is modeled by a sandstone tube having a longitudinal hole drilled therethrough. The sandstone tubes were arranged in series and flow occurs horizontally through the core centers and radially outward through the body of each core. The core arrangement of FIG. 13 shows one of the most demanding horizontal well situations in which a high permeability zone (here a high permeability core) is located at the head of the well functioning as a large "thief-zone" stealing most of the treatment fluid. If a diverting filter cake functions adequately under these conditions, then it will be well suited for most other reservoir conditions.

Figure 14:
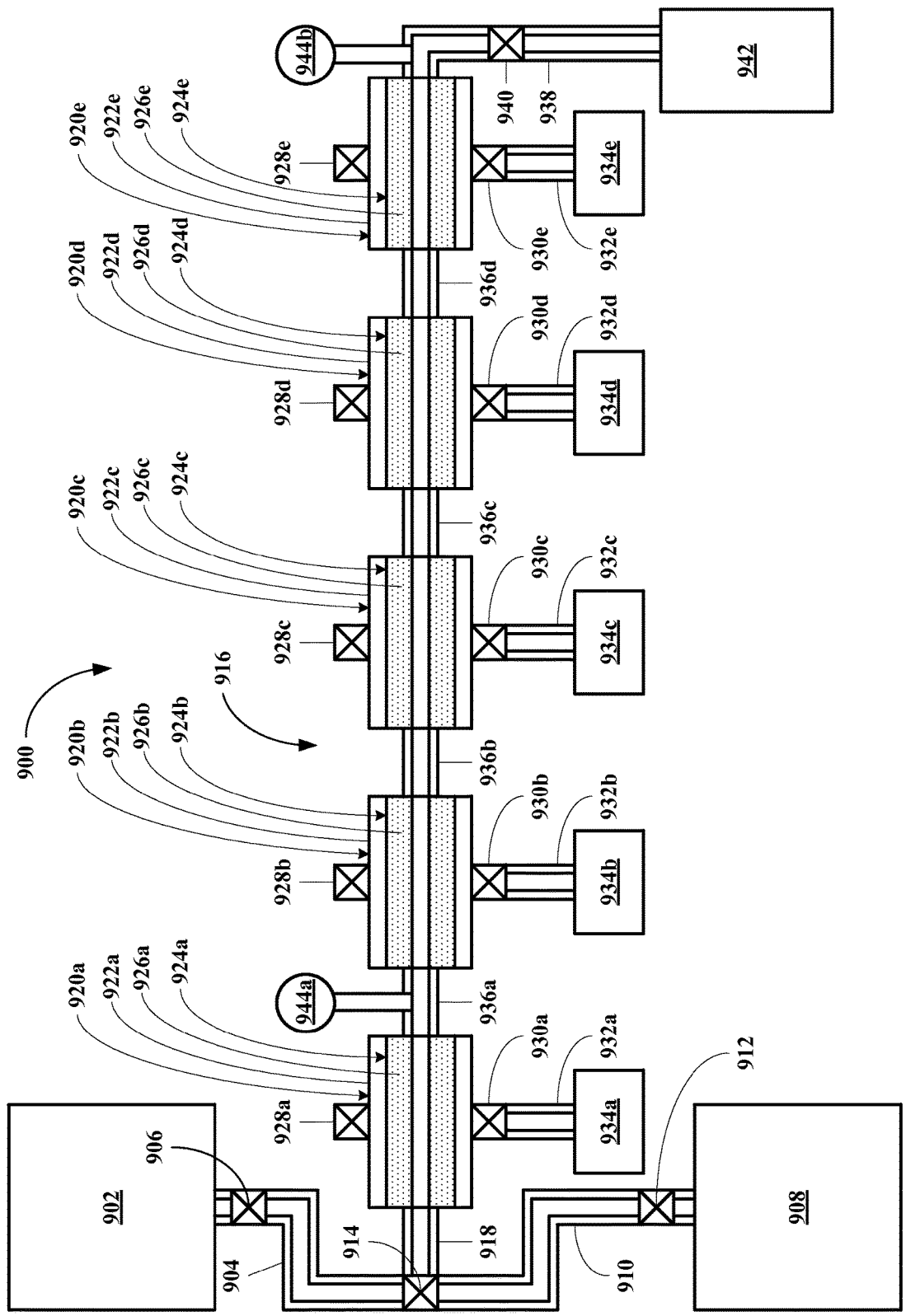
FIG. 14 depicts an embodiment of a model horizontal well apparatus.

Referring now to FIG. 14, an embodiment of the apparatus of FIG. 13, generally 900, is shown to include a fluid treatment reservoir 902 connected to a fluid delivery tube 904 including a fluid valve 906. The apparatus 900 also includes a filter material reservoir 908 connected to a slurry delivery tube 910 having a slurry valve 912. The tubes 904 and 910 are connected to a control valve 914 designed to permit either a fluid or a slurry to be directed into a horizontal well model section 916. The valve 914 is connected to the section 916 via inlet conduit 918. The section 916 includes five core assemblies 920a-e. The assemblies 920a-e include transparent outer layers 922a-e. Mounted in interiors 924a-e of the assemblies 120a-e are cores 926a-e having different permeabilities. The assemblies 920a-e also include top valves 928a-e and bottom valves 930a-e. The bottom valves 930a-e are connected via conduits 932a-e to flow collection containers 934a-e. The assemblies 920a-d are connected via interconnecting conduits 936a-d, while the assembly 920e is connected to an outlet conduit 938 having an outlet valve 940 leading to an outlet receiving container 942. The outer layers 922a-e of the assemblies 920a-e are constructed out of a clear material so that particulate flow may be visualized, are capable of withstanding up to 200 psi of pressure, and are capable of capturing the fluid flowing through each core. The clear material used here was machined clear polymethylmethacrylate (PMMA). The apparatus 900 also include one or more pressures sensors 944, here two 944a&b.

The apparatus 900 including the five zones of varying permeability is designed to collect flow-through liquid, which may be captured directly into contains such as beakers or may be routed through tubing attached to the valves around each core. The presence of the valves allows for flow to be directed to certain cores or through the end-valve. Pressure valves located at the beginning and end of the apparatus are used to calculate permeability changes throughout the process. A pump capable of flow-rates greater than 3 L/min is fed by a brine tank or from a mixing calcium carbonate slurry. A 3-way valve on the pump inlet allows pumping of either the brine or particulate slurry sequentially.

Using Model Apparatus

Three main steps were performed to show that effectiveness of the diverting filter cakes of this invention with the model apparatus. First, it was necessary to show that uneven flow patterns exist with the model apparatus using cores of different permeabilities. Second, it was necessary to show that the filter compositions of this invention form filter cakes on the bore through the cores leading to a more uniform or even flow through all of the cores. In certain embodiments, the filter cakes will form uniform or substantially uniform flow through all of the cores. Finally, it was necessary to show that the filter cakes erode or dissolve over time restoring the original permeabilities of the cores without permeability damage to the cores. In a typical experiment, a 3 wt. % KCl brine was pumped through the apparatus 100 for 2 min at a flow rate of about 3 L/min and flow through each core was collected and the pressure in the apparatus was measured. Measurement of pressure at the beginning and end of the apparatus showed that constant pressure was present along the entire system, because of the relatively small interval lengths. Equation 1 shows the calculation of permeability in a radial flow regime $$k = \frac{Q\mu \ln(r_o/r_i)}{2\pi h \Delta p} \quad (1)$$

where k is the permeability, Q is the flow rate, $\mu$ is the viscosity, $r_o$ is the outer radius, $r_i$ is the inner radius, h is the length of interval, and $\Delta p$ is the differential pressure. Because permeability depends on fluid flow and differential pressure and pressure is the same at each core, fluid flow through each core is directly proportional to the permeability.

After the initial flow and permeability values for each core were recorded, a calcium carbonate slurry is pumped to establish a filter cake on the interior surface of each core. The particulate concentration was designed to be sufficiently high to allow effective bridging. In this case, 2 wt. % calcium carbonate was found to give good results and was pumped onto the cores at 3 L/min, which was determined to be a sufficiently high pump rate. The pumping method involved 1) slurry and brine were pumped alternatively for 30 seconds each for a total of 5 minutes, 2) brine was pumped to clear out any suspended solids, and 3) brine was pumped for 10 minutes and the amount of liquid produced over this time period was recorded.

While calcium carbonate particles centered around 5 μm calcium carbonate (Imerys Wel-Carb 5) formed diversion layers, the smaller particle size distribution materials form better using a different pumping regimes, for instance where pumping of zeta potential or aggregation modifying agents and filter cake is alternated rather than pre-forming a filter cake.

Figure 15:
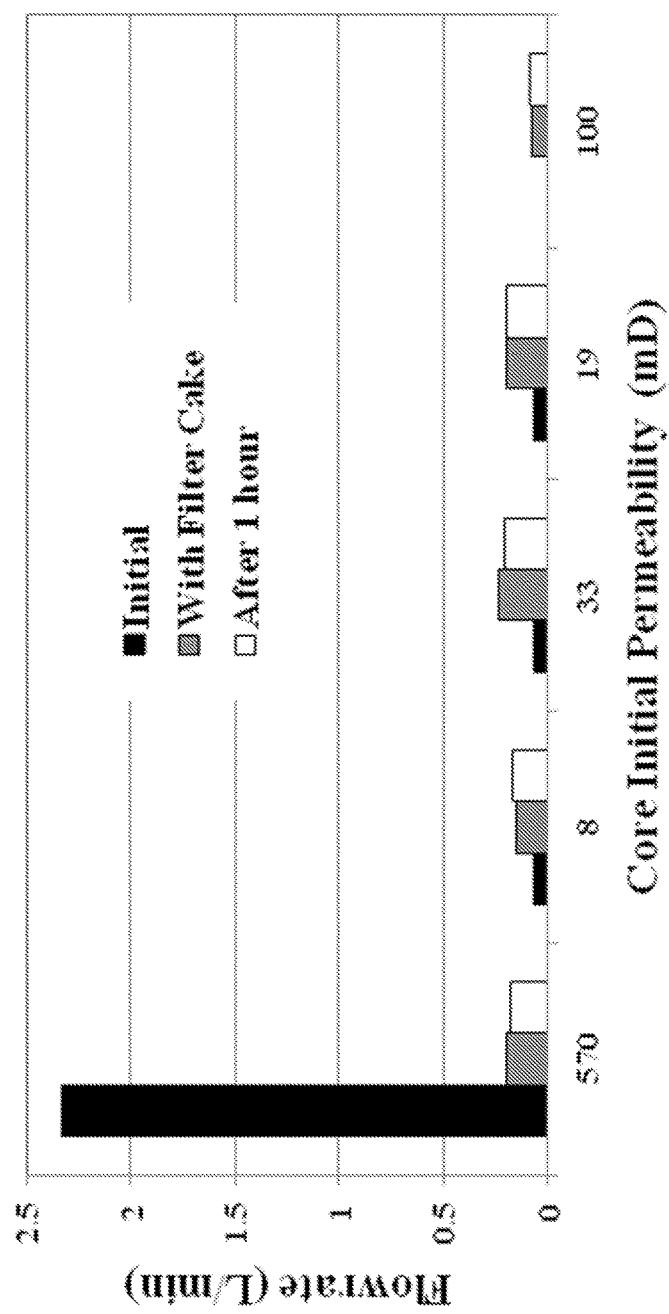
FIG. 15 depicts flowrates through each core initially, with Wel-Carb 20 filter cake, and again after an hour with filter cake.

For particulate compositions having a broader particle size distribution (PSD) such as Wel-Carb 20 which has a similar PSD to the Wel-Carb 25, the diversion layer or filter cake results are shown in FIG. 15, which showed highly imbalanced flow at the start, even flow after the filter cake had been formed, and also showed that the filter cake remained stable even after pumping was stopped and pressure removed for an hour (and even a day). The results are displayed from left to right corresponding to the first to last core in the model apparatus and the flow volume was measured for 2 minutes in the initial stage and 10 minutes with the filter cakes. Overall flow rate decreases greatly, because of the reduced permeability of the cores and increased differential pressure buildup in the model apparatus. The effective per-core permeability was found to be about 13 mD or a filter cake permeability of about 1 mD assuming a filter cake thickness of 0.5 mm.

Figure 16:
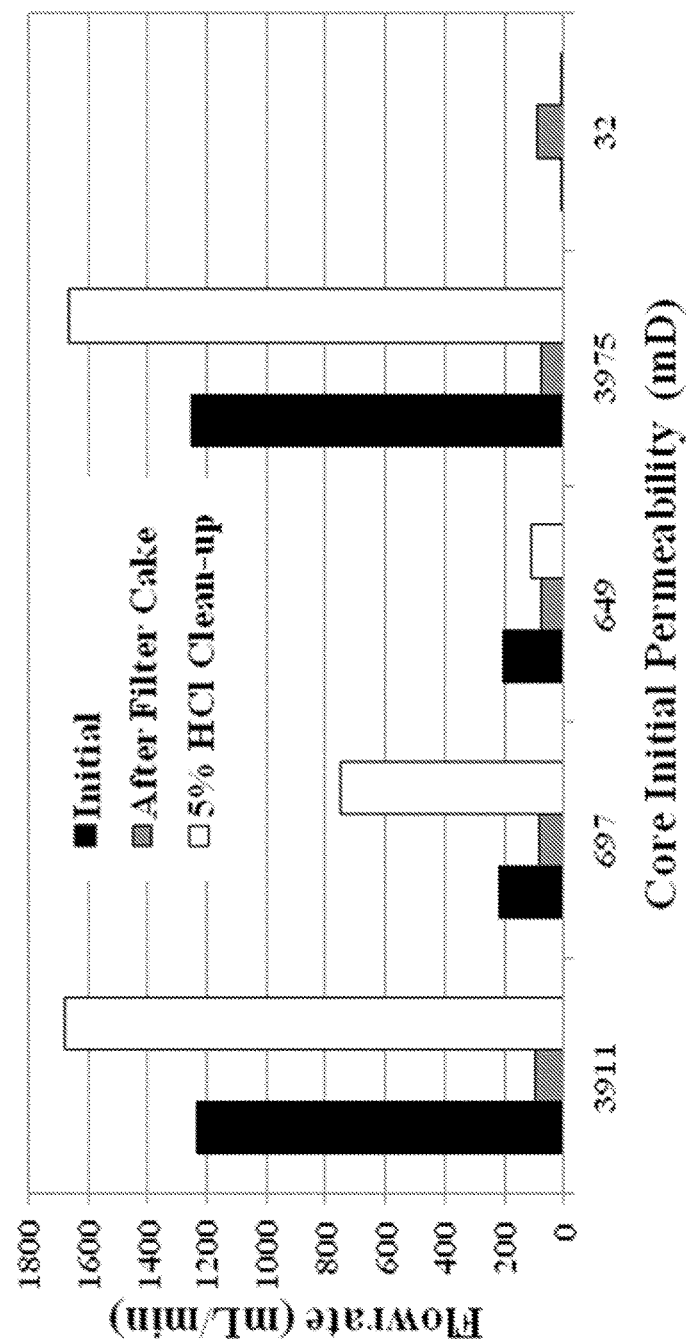
FIG. 16 depicts flowrates through each core initially, with Wel-Carb 50 filter cake, and again after an hour with filter cake.

For even larger particle size compositions such as Wel-Carb 50 with a $D_{50}$ of 39.6 μm, the results are shown in FIG. 16. In this case, two zones have very high permeabilities and would act as the major thief-zones in a well. Formation of the filter cakes decreased flow rates through all cores to about the same level. This means that the filter cakes are still acting successfully to equalize the core permeabilities and produce even flow along the apparatus. Dissolution with acid shows that flow rates rebound to at least pre-filter cake levels, demonstrating efficient removal of the calcium carbonate.

Figure 17:
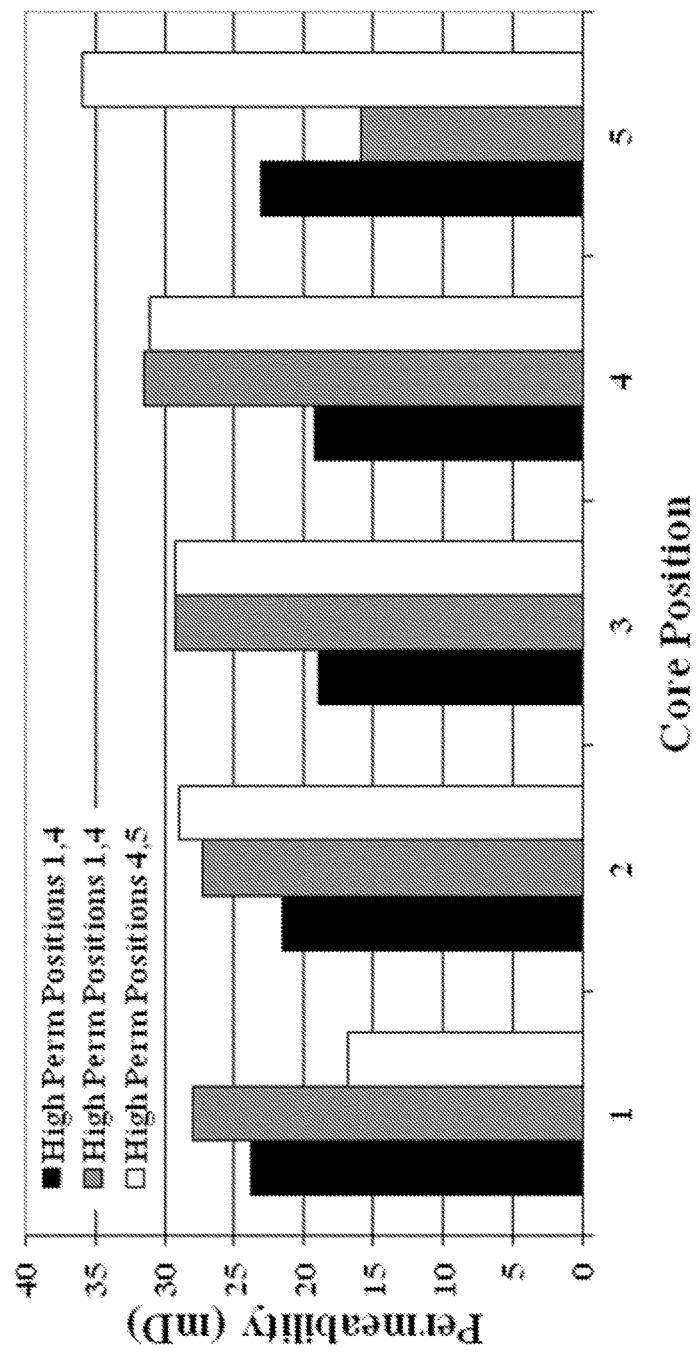
FIG. 17 depicts a summary of the effective core permeabilities after filter cake formation and demonstrates the ability to equalize permeability across the model formation.

This experiment was carried out two more times with different core configurations to confirm that the results were reproducible and worked in different well structures. Core configurations included highest permeability core at the start, middle, and end of the model apparatus. FIG. 17 shows a summary of the effective core permeabilities after filter cake formation and demonstrates the ability to equalize permeability across the model formation. The results are tabulated below for initial flow rates and permeabilities, with filter cake values and after filter cake removal values (removal here by HCl solution treatment):

| Initial | | With Filter Cake | | After Dissolution | |
|---|---|---|---|---|---|
| Flowrate (mL/min) | Permeability (mD) | Flowrate (mL/min) | Permeability (mD) | Flowrate (mL/min) | Permeability (mD) |
| 1235 | 3911.4 | 94 | 23.8 | 1675 | 3617.0 |
| 220 | 696.8 | 85 | 21.5 | 750 | 1619.6 |
| 205 | 649.3 | 75 | 19.0 | 110 | 237.5 |
| 1255 | 3974.8 | 76 | 19.3 | 1665 | 3595.4 |
| 10 | 31.7 | 91.5 | 23.2 | 10 | 21.6 |

It may also not be necessary to form a filter cake evenly along the entire wellbore as it may be sufficient to bring the permeability of the higher permeability segments near to the level of the lowest permeability segments. A real well may also have larger cracks, fractures, etc. on which it would be impossible to form a filter cake with small size particulate. In such scenarios, it may be necessary to use a graded pumping regime starting with large diameter material and working down to particle sizes sufficient to even out the flow profile across the formation.

EXAMPLES

Test Filter Cake Formation and Permeability

Samples of Wel-Carb 2, 5, 20, 25, and 50 were obtained from Imerys.

Filter cake permeability was determined by weighing 8 g of calcium carbonate and adding it directly to a filter press having about a 2500 mD ceramic disk. Brine was added and particulate was manually mixed with a spatula. Brine (at least 350 mL) was passed under atmospheric pressure through the filter press to form the filter cake. Once formed, a volume of brine in the filter press was constantly topped off to maintain the volume at about 350 mL while the volume flowing through the filter press was recorded. The pressure due to gravity and the flow rate was calculated and Darcy's law was used to calculate the permeability. The flow-through filter press apparatus was found to be the easiest method to achieve constant flow or pressure through the filter cake.

Treatment Through Filter Cake

Figure 12:
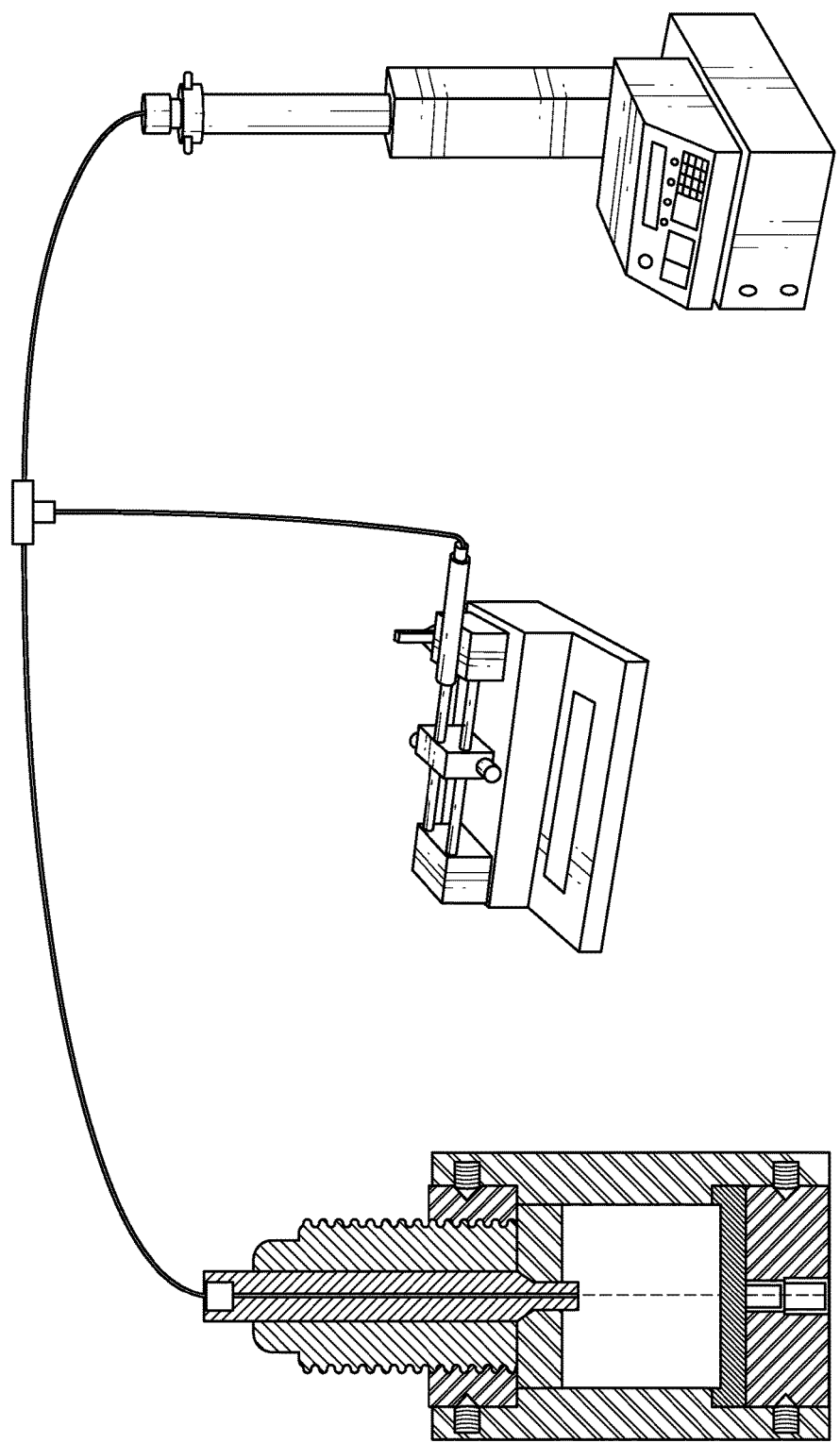
FIG. 12 depicts a filter cake after on-the-fly zeta potential or aggregation modifying agent treatment (left) and sand agglomerated by zeta potential or aggregation modifying agent passing through filter cake (right).

On-the-fly injection of a treatment through the filter cake was carried out using a 100 mL filter press modified with a flow-through piston attachment as shown in FIG. 12. 5 g of PLA were added directly to the filter press with about a 2500 mD ceramic disk followed by brine, which was then mixed to suspend the solid. The set-up was heated to 180° F. Next brine was passed through the apparatus at 20 mL/min for a total of 100 mL to form the filter cake. Next, a sand control agent (SandAid) was injected on the fly at 10 vol. % concentration until SandAid droplets began to elute from bottom of filter press. The sand control chemical was stirred with sand, demonstrating retention of sand aggregation ability.

Test Removal of the Filter Cake

Acetate buffers at pH 4.5, pH 4.75, and pH 5 were created by addition of 25% NaOH solution to 10% acetic acid solution in water until the proper pH was reached. Sand was agglomerated with the zeta potential or aggregation modifying agent SandAid using the standard beaker agglomeration test: to 100 g 20/40 sand mixed in 100 mL 2 wt. % KCl brine was added 7 mL SandAid, the solution was washed twice with 100 mL brine, and the agglomerated sand transferred to a bottle. Next, 100 mL of the appropriate acetate buffer was added and aged overnight. Bottles were inverted to test for agglomeration.

Build Horizontal Well Model Apparatus

Assembly of apparatus of FIG. 14: Cores were washed to remove drilling fines and allowed to dry. End pieces were attached to the cores by placing clear silicone RTV onto the end piece and carefully inserting onto core and squeezing down by hand. After one end piece is attached, the process is repeated on the other side. RTV is allowed to set for 24 hours before continuing.

O-rings are inserted into the plastic core-holder sections and the cores are inserted with some lubricant added to sides of plastic core end-pieces to aid insertion. Apparatus is then assembled by alternating one core-holder and one intermediate piece. Stainless steel threaded rods are used to hold the apparatus together as shown in FIG. 14 and are tightened enough to seal the flange O-rings. Plastic nipples are attached to threaded openings in core-holder sections and stainless steel valves are attached to those. End-flanges with appropriate fittings are attached to ends of the apparatus. Pressure gauges are placed at the start of the apparatus and at each connecting tube as desired. Valves were placed to allow flow through the end of the apparatus and to divert flow at the start of the apparatus. A gear pump and inverter motor capable of about 15 L/min flow rate was used. A pressure-release valve (150-200 psi max pressure) must be used to prevent unsafe rise in pressure.

Using Model Apparatus

Procedure for filter cake formation in long-horizontal well model apparatus: 60 L of 3 wt. % KCl brine was made up and transferred to holding tank. 10 L of 2 wt. % by mass calcium carbonate suspension was made up and stirred at between 150 rpm and 200 rpm with a large mixing blade. A 3-way valve was used to feed either brine or carbonate slurry into the apparatus at a pump rate of 15 Hz. Initial flow and permeability was measured by flowing brine at 15 Hz (about 3 L/min) for 2 min and collecting the effluent of each core in a beaker and massed. Next, carbonate slurry and brine were alternatively pumped for 30 seconds each for a total of 5 min and brine was pumped for 1 more minute. At this point, beakers were switched out for empty ones and flow was continued for 10 min, after which fluid in each beaker was massed.

Acid dissolution of filter cake was carried out by pumping 5% HCl through the apparatus, and then the core holder valves were closed one after another until the core holders were filled with acid solution. After the apparatus was shut-in overnight, brine was flowed through the apparatus to clear out the acid and then was flown again for 2 minutes to record the flow.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

The invention claimed is:

1. A system comprising:
   a well bore drilled into a geological structure including a producing or injection formation, interval, or intervals, where the formation has, the interval has, or the intervals have high permeability zones and where one or more of the high permeability zones have a permeability greater than 100 mD,
   a diversion layer or a plurality of diversion layers formed on a surface or surfaces of the formation, the interval, or the intervals and comprising at least one particulate erodible or dissolvable component and at least one removable particulate component, wherein the layer or layers have an effective permeability between about 1 mD and about 100 mD so that the entire surface or surfaces of the formation, the interval or the intervals have the same or substantially the same effective permeability, and
   a pump to pump a treating fluid into the well bore, through the diversion layer or the plurality of diversion layers and into the formation, interval, or intervals, so that the treatment across the formation, the interval, or the intervals is equal or substantially equal based on the effective permeability of the diversion layer and or layers formed on the surface of the formation, interval or intervals, and wherein after the treating fluid passes through the diversion layer or layers, the erodible or dissolvable particulate components erode or dissolve in contact with well fluids or erode or dissolve by exposing the diversion layer or layers to a dissolving fluid, and where the removable particulate components are removed by exposing the diversion layer or layers to a removing fluid restoring the original permeabilities of the formation, the interval, or the intervals.

2. The system of claim 1, further comprising:
   a well screen assembly, a gravel pack, or a sand pack associated with the formation, interval, or intervals, and
   wherein the layer or layers are formed on a surface of the screen assembly, the gravel pack or the sand pack or passed through the assembly or packs to form between the assembly or the packs and the formation or interval surfaces or in a lower portion of the assembly or the packs and wherein the layer or layers formed on the assembly or the packs equalize or substantially equalize the permeability across the formation, interval or intervals.

3. The system of claim 1, further comprising:
   a packer or a plurality of packers to isolate the formation, interval or intervals, and
   a work string or production tubing.

4. The system of claim 1, wherein the particulate materials having a desired particle size distribution, a desired particle shape distribution and size distribution, or a desired particle shape distribution, size distribution, and density distribution, where the permeability of the layer or layers are established due to the packing of the particles forming the layer or layers.

5. The system of claim 1, wherein the permeability of the layer or layers change over time as the erodible or dissolvable materials erode or dissolve over time due to being in contact with well fluids or due to being in contact with a dissolution fluid introduced into the well.

6. The system of claim 4, wherein the removable materials are selected from the group consisting of (1) alkaline metal carbonates, (2) asphalts, and (3) mixtures or combinations thereof, and
   wherein the erodible or dissolvable materials are selected from the group consisting of hydratable polymers, gelled hydratable polymers, hydrocarbon soluble polymers, and mixture and combinations thereof.

7. The system of claim 6, wherein the alkaline metal carbonates are selected from the group consisting of magnesium carbonate ($MgCO_3$), calcium carbonate ($CaCO_3$), strontium carbonate ($SrCO_3$), and/or barium carbonate ($BaCO_3$) and combinations or mixtures thereof and wherein the asphalts are selected from the group consisting of gilsonite, bitumen, asphaltum and combinations or mixtures thereof.

8. The system of claim 6, wherein the hydratable polymers are selected from the group consisting of natural hydratable polymers, synthetic hydratable polymers, and combinations or mixtures thereof.

9. The system of claim 8, wherein the natural hydratable polymers are selected from the group consisting of galactomannan gums, glucomannan gums, guars, derived guars, cellulose derivatives, and mixtures or combinations thereof and the synthetic hydratable polymers are selected from the group consisting of polyvinyl alcohol, polyacrylamides, poly-2-amino-2-methyl propane sulfonic acid, and various other synthetic polymers, copolymers, and mixtures or combinations thereof.

10. The system of claim 1, wherein the well treatments for producing wells are selected from the group consisting of a sand control treatment, an aggregating treatment, a zeta modifying treatment, a sticky/tacky material treatment, a sand consolidation/formation consolidation treatment, an in situ polymerizable formation consolidate treatment, a scale inhibitor treatment, a paraffin inhibitor treatment, a wettability modifier treatment, a biocide treatment, a gel breaker treatment, an enzyme treatment, a defoamer treatment, an acid treatment, and mixtures or combinations thereof, and wherein the well treatments for injection wells are selected from the group consisting of a surfactant treatment and a polymer flooding treatment.

11. A method for diverting well treatments comprising:
    forming a diversion layer or a plurality of diversion layers on a formation surface, an interval surface, a plurality of interval surfaces, on well screen assembly, a gravel pack, and/or a sand pack associated with a formation or interval surface, or between the formation or interval surface and a production tubing or working string, where the formation, interval or intervals including high permeability zones and where one or more of the high permeability zones have a permeability greater than 100 mD, where the layer or layers comprise at least one erodible or dissolvable component and at least one removable component and have an effective permeability between about 1 mD and about 100 mD so that the entire surface or surfaces of the formation, the interval, or the intervals have the same or substantially the same effective permeability,
    pumping a treating fluid into the well, and
    diverting the treating fluid as it passes through the layer or layers having the effective permeability into the formation, the interval, or the intervals improving coverage, uniformity, and/or completeness of treatment across the formation, the interval, or the intervals, and where after the treating fluid passes through the diversion layer or layers, the erodible or dissolvable components erode or dissolve in contact with well fluids or erode or dissolve by exposing the diversion layer or layers to a dissolving fluid, and the removable components are removed by exposing the diversion layer or layers to a removing fluid restoring the original permeabilities of the formation, the interval, or the intervals.

12. The method of claim 11, further comprising:
isolating the interval using an isolation packer or a plurality of packers prior to forming the layers.

13. The method of claim 11, wherein the layer or layers comprise particulate materials having a desired particle size distribution, a desired particle shape distribution and size distribution, or a desired particle shape distribution, size distribution, and density distribution, where the permeability of the layer or layers are established due to the packing of the particles forming the layer or layers.

14. The system of claim 11, wherein the permeability of the layer or layers change over time as the erodible or dissolvable materials erode or dissolve over time due to being in contact with well fluids or due to being in contact with a dissolution fluid introduced into the well.

15. The system of claim 13, wherein the removable materials are selected from the group consisting of (1) alkaline metal carbonates, (2) asphalts, and (3) mixtures or combinations thereof, and
wherein the erodible or dissolvable materials are selected from the group consisting of hydratable polymers, gelled hydratable polymers, hydrocarbon soluble polymers, and mixture and combinations thereof.

16. The system of claim 15, wherein the alkaline metal carbonates are selected from the group consisting of magnesium carbonate ($MgCO_3$), calcium carbonate ($CaCO_3$), strontium carbonate ($SrCO_3$), and/or barium carbonate ($BaCO_3$) and combinations or mixtures thereof and wherein the asphalts are selected from the group consisting of gilsonite, bitumen, asphaltum and combinations or mixtures thereof.

17. The system of claim 15, wherein the hydratable polymers are selected from the group consisting of natural hydratable polymers, synthetic hydratable polymers, and combinations or mixtures thereof.

18. The system of claim 17, wherein the natural hydratable polymers are selected from the group consisting of galactomannan gums, glucomannan gums, guars, derived guars, cellulose derivatives, and mixtures or combinations thereof and the synthetic hydratable polymers are selected from the group consisting of polyvinyl alcohol, polyacrylamides, poly-2-amino-2-methyl propane sulfonic acid, and various other synthetic polymers, copolymers, and mixtures or combinations thereof.

19. The system of claim 13, wherein the well treatments for producing wells are selected from the group consisting of a sand control treatment, an aggregating treatment, a zeta modifying treatment, a sticky/tacky material treatment, a sand consolidation/formation consolidation treatment, an in situ polymerizable formation consolidate treatment, a scale inhibitor treatment, a paraffin inhibitor treatment, a wettability modifier treatment, a biocide treatment, a gel breaker treatment, an enzyme treatment, a defoamer treatment, an acid treatment, and mixtures or combinations thereof, and where the well treatments for injection wells are selected from the group consisting of a surfactant treatment and a polymer flooding treatment.

20. A system for diverting well treatments comprising:
a source subsystem including a filter cake composition including sized, selectively erodible or dissolvable particles and removable particles capable of forming a predictable low permeability filter-cake;
a filter-cake placement subsystem for engineered placement of the filter-cake composition to create a predictable low permeability filter-cake on a surface of a producing formation, interval, or intervals, on a surface of an injection formation, interval, or intervals, in an annular space between the formation or interval surfaces and production tubing surface, on a surface of a screen assembly, on a surface of a gravel and/or on a surface of a sand pack, where the formation, interval or intervals includes high permeability zones and where one or more of the high permeability zones have a permeability greater than 100 mD, where the filter-cake composition is placed using a Newtonian fluid or a non-Newtonian fluid, where the filter cake has an effective permeability between about 1 mD and about 100 mD equalizing or substantially equalizing permeabilities across the formation, interval or intervals; and
an injection subsystem for injecting a treating fluid into the formation, interval or intervals, through the filter cake having the effective permeability improving coverage, uniformity, and/or completeness of treatment across the formation, the interval, or the intervals, where after the treating fluid passes through the filter cake, the erodible or dissolvable particles erode or dissolve in contact with well fluids or erode or dissolve by exposing the filter cake to a dissolving fluid and the removable particles are removed by exposing the filter cake to a removing fluid restoring the original permeabilities of the formation, the interval, or the intervals,
wherein the well treatments for producing wells are selected from the group consisting of a sand control treatment, an aggregating treatment, a zeta modifying treatment, a sticky/tacky material treatment, a sand consolidation/formation consolidation treatment, an in situ polymerizable formation consolidate treatment, a scale inhibitor treatment, a paraffin inhibitor treatment, a wettability modifier treatment, a biocide treatment, a gel breaker treatment, an enzyme treatment, a defoamer treatment, an acid treatment, and mixtures or combinations thereof, and where the well treatments for injection wells are selected from the group consisting of a surfactant treatment and a polymer flooding treatment.

\* \* \* \* \*